(12) United States Patent
Fux et al.

(10) Patent No.: US 9,946,360 B2
(45) Date of Patent: *Apr. 17, 2018

(54) HANDHELD ELECTRONIC DEVICE WITH TEXT DISAMBIGUATION

(71) Applicant: BlackBerry Limited, Waterloo (CA)

(72) Inventors: Vadim Fux, Waterloo (CA); Michael G. Elizarov, Waterloo (CA); Sergey V. Kolomiets, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 347 days.

This patent is subject to a terminal disclaimer.

(21) Appl. No.: 14/506,415

(22) Filed: Oct. 3, 2014

(65) Prior Publication Data

US 2015/0022456 A1 Jan. 22, 2015

Related U.S. Application Data

(63) Continuation of application No. 13/173,424, filed on Jun. 30, 2011, now Pat. No. 8,854,232, which is a
(Continued)

(51) Int. Cl.
*G06F 3/00* (2006.01)
*G06F 3/023* (2006.01)
(Continued)

(52) U.S. Cl.
CPC .......... *G06F 3/0237* (2013.01); *G06F 3/0202* (2013.01); *G06F 17/276* (2013.01); *H04M 2250/70* (2013.01)

(58) Field of Classification Search
CPC .... G06F 3/0202; G06F 3/0237; G06F 17/276; H04M 2250/70
(Continued)

(56) References Cited

U.S. PATENT DOCUMENTS 5,818,437 A  10/1998  Grover et al.
5,847,697 A  12/1998  Sugimoto
(Continued)

FOREIGN PATENT DOCUMENTS

EP  1256871 A2  11/2002
EP  1603022 A1  12/2005
(Continued)

OTHER PUBLICATIONS

Canadian Office Action in Canadian Application No. 2,589,126, dated Oct. 18, 2011, 4 pages.
(Continued)

*Primary Examiner* — Albert K Wong
(74) *Attorney, Agent, or Firm* — Fish & Richardson P.C.

(57) ABSTRACT

A handheld electronic device enabled with disambiguation software. The device provides output in the form of a default output and a number of variants. The output is based largely upon the frequency, i.e., the likelihood that a user intended a particular output, but various features of the device provide additional variants that are not based solely on frequency and rather are provided by various logic structures resident on the device. The device enables editing during text entry and also provides a learning function that allows the disambiguation function to adapt to provide a customized experience for the user. The disambiguation function can be selectively disabled and an alternate keystroke interpretation system provided. Additionally, the device can facilitate the selection of variants by displaying a graphic of a special <NEXT> key of the keypad that enables a user to progressively select variants generally without changing the position of the user's hands on the device.

13 Claims, 9 Drawing Sheets

Related U.S. Application Data continuation of application No. 11/845,617, filed on Aug. 27, 2007, now Pat. No. 7,994,943, which is a continuation of application No. 10/859,067, filed on Jun. 2, 2004, now Pat. No. 7,312,726.

(51) Int. Cl.
*G06F 3/02* (2006.01)
*G06F 17/27* (2006.01)

(58) Field of Classification Search
USPC .................. 341/22; 345/168–169; 704/250
See application file for complete search history.

(56) References Cited

U.S. PATENT DOCUMENTS

| | | | |
|---|---|---|---|
| 5,896,321 A | 4/1999 | Miller et al. | |
| 5,952,942 A | 9/1999 | Balakrishnan et al. | |
| 5,953,541 A | 9/1999 | King et al. | |
| 6,011,554 A | 1/2000 | King et al. | |
| 6,204,848 B1* | 3/2001 | Nowlan ............... | G06F 3/0237 341/22 |
| 6,286,064 B1 | 9/2001 | King et al. | |
| 6,307,548 B1 | 10/2001 | Flinchem et al. | |
| 6,307,549 B1 | 10/2001 | King et al. | |
| 6,349,282 B1 | 2/2002 | Van Aelten et al. | |
| 6,392,640 B1 | 5/2002 | Will | |
| 6,574,597 B1 | 6/2003 | Mohri et al. | |
| 6,636,162 B1 | 10/2003 | Kushler et al. | |
| 6,646,573 B1 | 11/2003 | Kushler et al. | |
| 6,647,383 B1 | 11/2003 | August et al. | |
| 6,734,881 B1 | 5/2004 | Will | |
| 6,744,423 B2 | 6/2004 | Kraft et al. | |
| 6,801,190 B1 | 10/2004 | Robinson et al. | |
| 6,885,317 B1 | 4/2005 | Gutowitz | |
| 7,030,863 B2 | 4/2006 | Longe et al. | |
| 7,081,837 B2 | 7/2006 | Bollman | |
| 7,088,345 B2 | 8/2006 | Robinson et al. | |
| 7,091,885 B2 | 8/2006 | Fux et al. | |
| 7,117,144 B2 | 10/2006 | Goodman et al. | |
| 7,129,932 B1 | 10/2006 | Klarland et al. | |
| 7,165,019 B1 | 1/2007 | Lee et al. | |
| 7,190,351 B1 | 3/2007 | Goren | |
| 7,269,548 B2 | 9/2007 | Fux et al. | |
| 7,277,088 B2 | 10/2007 | Robinson et al. | |
| 7,312,726 B2 | 12/2007 | Fux et al. | |
| 7,324,083 B2 | 1/2008 | Fux et al. | |
| 7,358,866 B2 | 4/2008 | Fux et al. | |
| 7,475,004 B2 | 1/2009 | Fux et al. | |
| 7,636,083 B2 | 12/2009 | Aoki et al. | |
| 7,646,375 B2 | 1/2010 | Fux et al. | |
| 7,679,534 B2 | 3/2010 | Kay et al. | |
| 7,712,053 B2 | 5/2010 | Bradford et al. | |
| 7,765,345 B2 | 7/2010 | Fux et al. | |
| 7,804,484 B2 | 9/2010 | Martinez et al. | |
| 7,880,730 B2 | 2/2011 | Robinson et al. | |
| 7,920,132 B2 | 4/2011 | Longe et al. | |
| 7,969,329 B2 | 6/2011 | Fux et al. | |
| 7,969,415 B2 | 6/2011 | Fux et al. | |
| 7,994,943 B2 | 8/2011 | Fux et al. | |
| 8,179,289 B2 | 5/2012 | Fux et al. | |
| 8,237,663 B2 | 8/2012 | Fux et al. | |
| 8,289,276 B2 | 10/2012 | Fux et al. | |
| 8,542,132 B2 | 9/2013 | Fux et al. | |
| 8,542,187 B2 | 9/2013 | Fux et al. | |
| 8,810,520 B2 | 8/2014 | Fux et al. | |
| 8,854,232 B2 | 10/2014 | Fux et al. | |
| 8,878,703 B2 | 11/2014 | Fux et al. | |
| 2002/0126097 A1 | 9/2002 | Savolainen | |
| 2002/0129010 A1 | 9/2002 | Fung et al. | |
| 2002/0140671 A1 | 10/2002 | Yamazaki | |
| 2002/0188448 A1 | 12/2002 | Goodman et al. | |
| 2002/0196163 A1 | 12/2002 | Bradford et al. | |
| 2003/0011574 A1 | 1/2003 | Goodman | |
| 2003/0104839 A1* | 6/2003 | Kraft ................. | G06F 3/0237 455/566 |
| 2003/0193478 A1 | 10/2003 | Ng et al. | |
| 2004/0021691 A1 | 2/2004 | Dostie et al. | |
| 2004/0056844 A1 | 3/2004 | Gutowitz et al. | |
| 2004/0104896 A1 | 6/2004 | Suraqui | |
| 2004/0155869 A1 | 8/2004 | Robinson et al. | |
| 2004/0264447 A1 | 12/2004 | McEvilly et al. | |
| 2005/0174333 A1 | 8/2005 | Robinson et al. | |
| 2005/0270183 A1 | 12/2005 | Fux et al. | |
| 2005/0273332 A1 | 12/2005 | Scott et al. | |
| 2006/0007118 A1 | 1/2006 | Fux et al. | |
| 2006/0007120 A1 | 1/2006 | Fux et al. | |
| 2006/0007121 A1 | 1/2006 | Fux et al. | |
| 2006/0007128 A1 | 1/2006 | Fux et al. | |
| 2006/0063558 A1 | 3/2006 | Scott | |
| 2006/0267950 A1 | 11/2006 | Fux et al. | |
| 2006/0274051 A1 | 12/2006 | Longe et al. | |
| 2007/0156618 A1 | 7/2007 | Meurs | |
| 2007/0168588 A1 | 7/2007 | Elizarov et al. | |
| 2007/0290892 A1 | 12/2007 | Fux et al. | |
| 2008/0010051 A1 | 1/2008 | Fux et al. | |
| 2008/0010052 A1 | 1/2008 | Fux et al. | |
| 2008/0048987 A1 | 2/2008 | Fux et al. | |
| 2008/0074388 A1 | 3/2008 | Fux et al. | |
| 2010/0073299 A1 | 3/2010 | Fux et al. | |
| 2011/0193735 A1 | 8/2011 | Fux et al. | |
| 2011/0196671 A1 | 8/2011 | Fux et al. | |
| 2011/0216010 A1 | 9/2011 | Fux et al. | |
| 2011/0267275 A1 | 11/2011 | Fux et al. | |
| 2011/0279290 A1 | 11/2011 | Fux et al. | |
| 2012/0194437 A1 | 8/2012 | Fux et al. | |
| 2013/0013292 A1 | 1/2013 | Fux et al. | |

FOREIGN PATENT DOCUMENTS

| | | |
|---|---|---|
| GB | 2431031 A | 12/2005 |
| GB | 2431266 A | 12/2005 |
| GB | 2431267 A | 12/2005 |
| WO | 9705541 | 2/1997 |
| WO | 9808688 | 3/1998 |
| WO | 9833111 | 7/1998 |
| WO | 9915952 | 1/1999 |
| WO | 0062150 | 10/2000 |
| WO | 0074240 | 12/2000 |
| WO | 0233527 A | 4/2002 |
| WO | 03060451 | 7/2003 |
| WO | 2004006122 A | 1/2004 |

OTHER PUBLICATIONS

Office Action issued in Indian Application No. 4767/DELNP/2007 dated Nov. 20, 2014; 2 pages.
Office Action issued in Canadian Application No. 2,730,205 dated Aug. 17, 2016.
Canadian Office Action in Canadian Application No. 2,730,205, dated Apr. 5, 2013, 5 pages.
Canadian Office Action in Canadian Application No. 2,730,205, dated Nov. 1, 2013, 4 pages.
Canadian Office Action in Canadian Application No. 2,730,205, dated Jun. 2, 2014, 4 pages.
"The Art of Computer Programming, Passage, pp. 479-489" 1973, Sorting and Searching, XX, XX, Page(s) Complete 13, XP001152145.
Advisory Action for related U.S. Appl. No. 11/845,617 dated Jan. 26, 2011 (3 pages).
Advisory Action in related U.S. Appl. No. 11/424,990 dated Jan. 7, 2010 (3 pages).
Brief Communication in related European Patent Application No. 04253270.5, mailed by the European Patent Office dated Oct. 16, 2008 (6 pages).
Brief Communication in related European Patent Application No. 04253287.9, mailed by the European Patent Office dated Aug. 31, 2010 (8 pages).
Brief Communication in related European Patent Application No. 04257257.8, mailed by the European Patent Office dated Mar. 24, 2006 (7 pages).

(56) References Cited

OTHER PUBLICATIONS

Communication in related European Patent Application No. 04253268.9, mailed by the European Patent Office dated Mar. 18, 2005 (11 pages).
Communication in related European Patent Application No. 04253268.9, mailed by the European Patent Office dated Sep. 19, 2006 (4 pages).
Communication in related European Patent Application No. 04253268.9, mailed by the European Patent Office dated Sep. 19, 2009 (7 pages).
Communication in related European Patent Application No. 04253269.7, mailed by the European Patent Office dated Mar. 6, 2008 (7 pages).
Communication in related European Patent Application No. 04253270.5, mailed by the European Patent Office dated Nov. 9, 2006 (7 pages).
Communication in related European Patent Application No. 04253270.5, mailed by the European Patent Office dated Oct. 15, 2004 (12 pages).
Communication in related European Patent Application No. 04253287.9, mailed by the European Patent Office dated Nov. 27, 2006 (5 pages).
Communication in related European Patent Application No. 04253287.9, mailed by the European Patent Office dated Sep. 29, 2004 (7 pages).
Communication in related European Patent Application No. 04257257.8, mailed by the European Patent Office dated Apr. 15, 2005 (6 pages).
Communication in related European Patent Application No. 08167114.1, mailed by the European Patent Office dated Dec. 18, 2008 (7 pages).
Communication in related German Patent Application No. 11 2005 001 283.2-53, mailed by the German Patent Office dated Jul. 23, 2010 (3 pages).
Communication in related German Patent Application No. 11 2005 001 283.2-53, mailed by the German Patent Office dated Sep. 18, 2009 (2 pages).
Communication in related German Patent Application No. 11 2005 001 284.0-53, mailed by the German Patent Office dated Jul. 29, 2010 (3 pages).
Communication in related German Patent Application No. 11 2005 001 284.0-53, mailed by the German Patent Office dated Sep. 18, 2009 (2 pages).
Communication in related German Patent Application No. 11 2005 001 314.6-53, mailed by the German Patent Office dated Aug. 27, 2010 (3 pages).
Communication in related German Patent Application No. 11 2005 001 314.6-53, mailed by the German Patent Office dated Sep. 18, 2009 (2 pages).
Communication in related German Patent Application No. 11 2005 001 315.4-53, mailed by the German Patent Office dated Aug. 27, 2010 (6 pages).
Communication in related German Patent Application No. 11 2005 001 315.4-53, mailed by the German Patent Office dated Sep. 18, 2000 (2 pages).
Communication in related German Patent Application No. 11 2005 022 888.7-53, mailed by the German Patent Office dated Nov. 27, 2008 (5 pages).
Communication in related UK Application No. GB0714373.8, mailed by the UK Intellectual Property Office dated Nov. 26, 2007 (2 pages).
Communication in related UK Patent Application No. GB0625975.8, mailed by the UK Intellectual Property Office dated Jul. 19, 2007 (2 pages).
Communication in related UK Patent Application No. GB0625977.4, mailed by the UK Intellectual Property Office dated May 22, 2007 (3 pages).
Communication in related UK Patent Application No. GB0714373.8, mailed by the UK Intellectual Property Office dated May 30, 2008 (2 pages).
Darragh et al., "The Reactive Keyboard: A Predictive Typing Aid," Computer, IEEE Computer Society, vol. 23, No. 11, Nov. 1, 1990, pp. 41-49.
Decision in related European Patent Application No. 04253269.7, mailed by the European Patent Office dated Jan. 12, 2009 (19 pages).
Decision in related European Patent Application No. 04253270.5, mailed by the European Patent Office dated Dec. 4, 2008 (19 pages).
Decision in related European Patent Application No. 04257257.8, mailed by the European Patent Office dated Sep. 13, 2006 (16 pages).
European Search Report in related European Patent Application No. 04253269.7, mailed by the European Patent Office dated Feb. 2, 2005 (15 pages).
European Search Report in related European Patent Application No. 04257257.8, mailed by the European Patent Office dated Feb. 3, 2005 (4 pages).
*Ex parte Quayle* Action for related U.S. Appl. No. 11/831,101 dated Dec. 3, 2009 (5 pages).
Examination Report in related UK Application No. GB0625979.0, mailed by the UK Intellectual Property office dated May 22, 2007 (3 pages).
Examination Report in related UK Application No. GB0711949.8, mailed by the UK Intellectual Property Office dated Mar. 18, 2010 (4 pages).
Examination Report in related UK Application No. GB0711949.8, mailed by the UK Intellectual Property Office dated Oct. 23, 2009 (5 pages).
Extended European Search Report in related European Patent Application No. 09173500.1, mailed by the European Patent Office dated Feb. 9, 2010 (10 pages).
First Office Action in related Chinese Patent Application No. 200580021679.1, mailed from the Chinese Patent and Trademark Office dated Dec. 12, 2008 (7 pages).
First Office Action in related Chinese Patent Application No. 200580046979.5, mailed from the Chinese Patent and Trademark Office dated Aug. 22, 2008 (8 pages).
International Preliminary Report on Patentability in related International Application No. PCT/CA2005/000855, mailed by the Canadian Intellectual Property Office dated Dec. 14, 2006 (5 pages).
International Preliminary Report on Patentability in related International Application No. PCT/CA2005/000858, mailed by the Canadian Intellectual Property Office dated Oct. 6, 2006 (3 pages).
International Preliminary Report on Patentability in related International Application No. PCT/CA2005/00859, mailed by the Canadian Intellectual Property Office dated Oct. 10, 2006 (6 pages).
International Search Report and Written Opinion in related International Application No. PCT/CA2005/000852, mailed by the Canadian Intellectual Property Office dated Aug. 23, 2005 (9 pages).
International Search Report and Written Opinion in related International Application No. PCT/CA2005/000855, mailed by the Canadian Intellectual Property Office dated Aug. 23, 2005 (10 pages).
International Search Report and Written Opinion in related International Application No. PCT/CA2005/000858, mailed by the Canadian Intellectual Property Office dated Aug. 23, 2005 (10 pages).
Marilla et al., "Time-Out in User Interface: The Case of Mobile Text Input," Personal and Ubiquitous Computing, vol. 8, Apr. 30, 2004, pp. 110-116.
Notice of Allowance for related U.S. Appl. No. 10/859,052 dated Nov. 13, 2007 (9 pages).
Notice of Allowance for related U.S. Appl. No. 10/859,067 dated Aug. 30, 2007 (8 pages).
Notice of Allowance for related U.S. Appl. No. 10/991,800 dated Jan. 16, 2008 (7 pages).
Notice of Allowance for related U.S. Appl. No. 11/831,101 dated Mar. 12, 2010 (4 pages).
Notice of Allowance for related U.S. Appl. No. 11/845,617 dated Apr. 1, 2011 (18 pages).
Notice of Allowance for related U.S. Appl. No. 11/931,543 dated Mar. 18, 2011 (21 pages).

(56) References Cited

OTHER PUBLICATIONS

Notice of Allowance for related U.S. Appl. No. 10/858,829 dated Mar. 21, 2006 (9 pages).
Notice of Allowance for related U.S. Appl. No. 10/858,863 dated Sep. 18, 2007 (8 pages).
Notice of Allowance for related U.S. Appl. No. 13/173,424 dated Sep. 2, 2014 (8 pages).
61 Notice of Allowance for related U.S. Appl. No. 13/111,509 dated Jun. 11, 2014 (8 pages).
Notice of Allowance for related U.S. Appl. No. 11/948,645 dated Mar. 16, 2011 (22 pages).
Office Acton for related U.S. Appl. No. 10/859,052 dated Jun. 4, 2007 (21 pages).
Office Action for related U.S. Appl. No. 10/859,067 dated Jun. 14, 2007 (19 pages).
Office Action for related U.S. Appl. No. 10/991,800 dated Aug. 14, 2007 (8 pages).
Office Action for related U.S. Appl. No. 11/424,990 dated Apr. 14, 2010 (18 pages).
Office Action for related U.S. Appl. No. 11/424,990 dated Oct. 18, 2010 (21 pages).
Office Action for retated U.S. Appl. No. 11/831,101 dated Jun. 19, 2009 (21 pages).
Office Action for related U.S. Appl. No. 11/831,139 dated Apr. 20, 2011 (10 pages).
Office Action for related U.S. Appl. No. 11/845,617 dated Dec. 29, 2009 (12 pages).
Office Action for related U.S. Appl. No. 11/845,617 dated Jul. 12, 2010 (10 pages).
Office Action for related U.S. Appl. No. 11/845,617 dated Nov. 17, 2010 (9 pages).
Office Action for related U.S. Appl. No. 11/931,543 dated Oct. 12, 2010 (16 pages).
Office Action for related U.S. Appl. No. 10/858,863 dated May 2, 2007 (14 pages).
Office Action for related U.S. Appl. No. 11/424,990 dated Apr. 2, 2009 (18 pages).
Office Action for related U.S. Appl. No. 11/424,990 dated Apr. 20, 2011 (6 pages).
Office Action for related U.S. Appl. No. 11/424,990 dated Oct. 14, 2009 (19 pages).
Office Action for related U.S. Appl. No. 11/948,645 dated Oct. 27, 2010 (14 pages).
Office Action in related Canadian Patent Application No. 2,509,010, mailed by the Canadian Intellectual Property Office dated Jan. 29, 2010 (2 pages).
Office Action in related Canadian Patent Application No. 2,509,011, mailed by the Canadian Intellectual Property Office dated Dec. 18, 2009 (4 pages).
Office Action in related Canadian Patent Application No. 2,509,014, mailed by the Canadian Intellectual Property Office dated Feb. 18, 2010 (4 pages).
Office Action in related Canadian Patent Application No. 2,509,015, mailed by the Canadian Intellectual Property Office dated Nov. 24, 2009 (4 pages).
Office Action in related Canadian Patent Application No. 2,589,126, mailed by the Canadian Intellectual Property Office dated Aug. 26, 2010 (3 pages).
Provision of a Copy of the Minutes in related European Patent Application No. 04253269.7, mailed by the European Patent Office dated Jan. 12, 2009 (5 pages).
Rejection Decision in related Chinese Patent Application No. 200580021679.1, mailed by the People's Republic of China dated Jan. 22, 2010 (6 pages).
Search Report in related UK Patent Application No. GB0714373.8, mailed by the UK Intellectual Property Office dated Oct. 16, 2008 (5 pages).
Second Office Action in related Chinese Patent Application No. 200580021679.1, mailed from the Peoples Republic of China dated Aug. 21, 2009 (7 pages).
Summons to Attend Oral Proceedings in related European Patent Application No. 04253269.7, mailed by the European Patent Office dated Aug. 8, 2008 (5 pages).
Summons to Attend Oral Proceedings in related European Patent Application No. 04253270.5, mailed by the European Patent Office dated Jul. 25, 2008 (6 pages).
Summons to Attend Oral Proceedings in related European Patent Application No. 04253287.9, mailed by the European Patent Office dated May 26, 2010 (8 pages).
Summons to Attend Oral Proceedings in related European Patent Application No. 04257257.8, mailed by the European Patent Office dated Aug. 3, 2010 (10 pages).
Summons to Attend Oral Proceedings in related European Patent Application No. 04257257.8, mailed by the European Patent Office dated Nov. 7, 2005 (5 pages).
First Examination Report dated Nov. 26, 2013, by India Patent Office in Application No. 7950/DELNP/2006 (2 pages).
International Search Report and Written Opinion in related International Application No. PCT/CA2005/000859, mailed by the Canadian Intellectual Properly Office dated Aug. 23, 2005 (8 pages).
International Search Report and Written Opinion in related International Application No. PCT/CA2005/001317, mailed by the Canadian Intellectual Property Office dated Dec. 14, 2005 (8 pages).
International Preliminary Report on Patentability in International Application No. PCT/CA2005/000852, dated Oct. 10, 2006, 21 pages.
International Preliminary Report on Patentability in International Application No. PCT/CA2005/00859, dated Oct. 10, 2006, 4 pages.
International Preliminary Report on Patentability in International Application No. PCT/CA2005/001317, dated May 23, 2007, 9 pages.

* cited by examiner

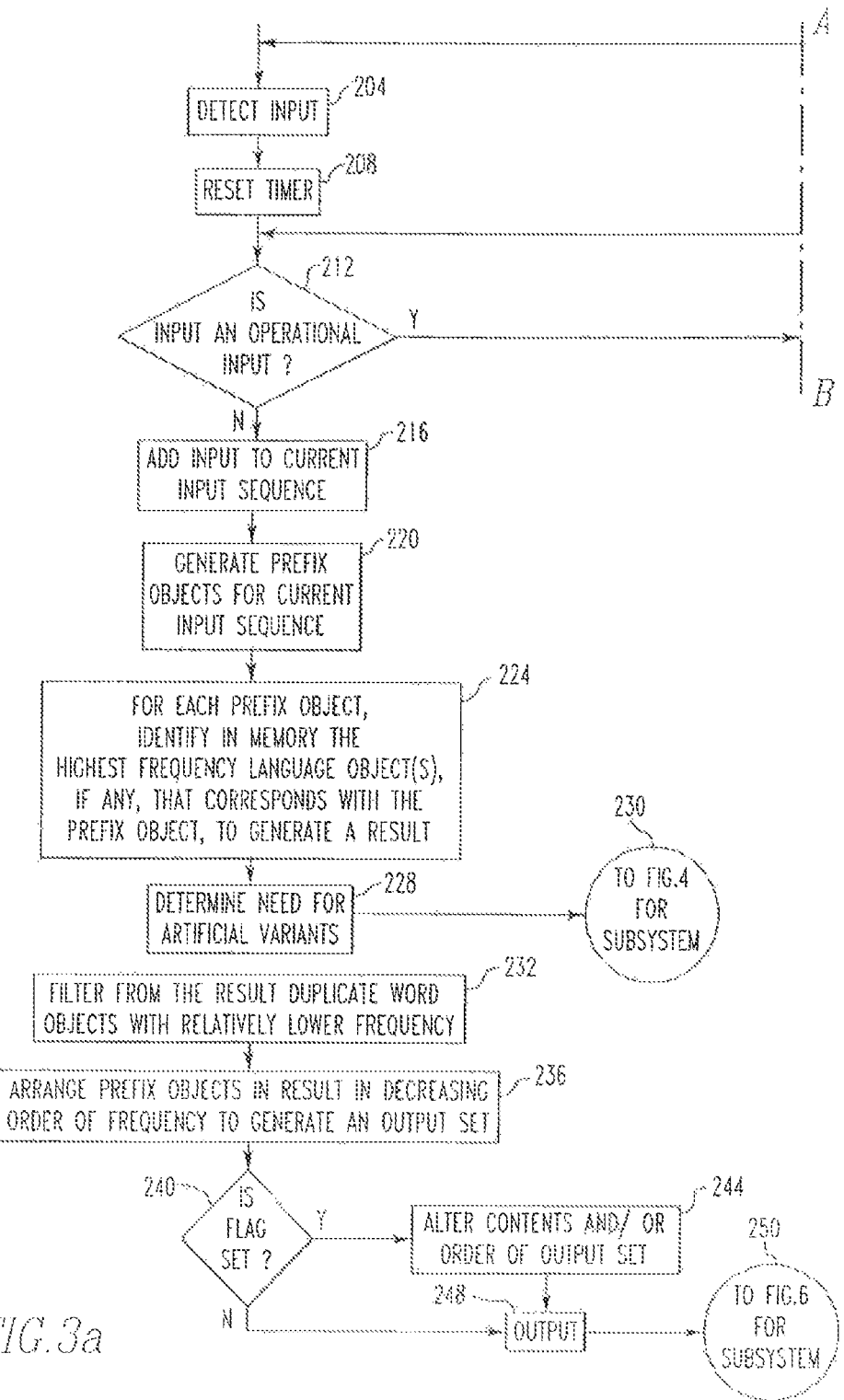

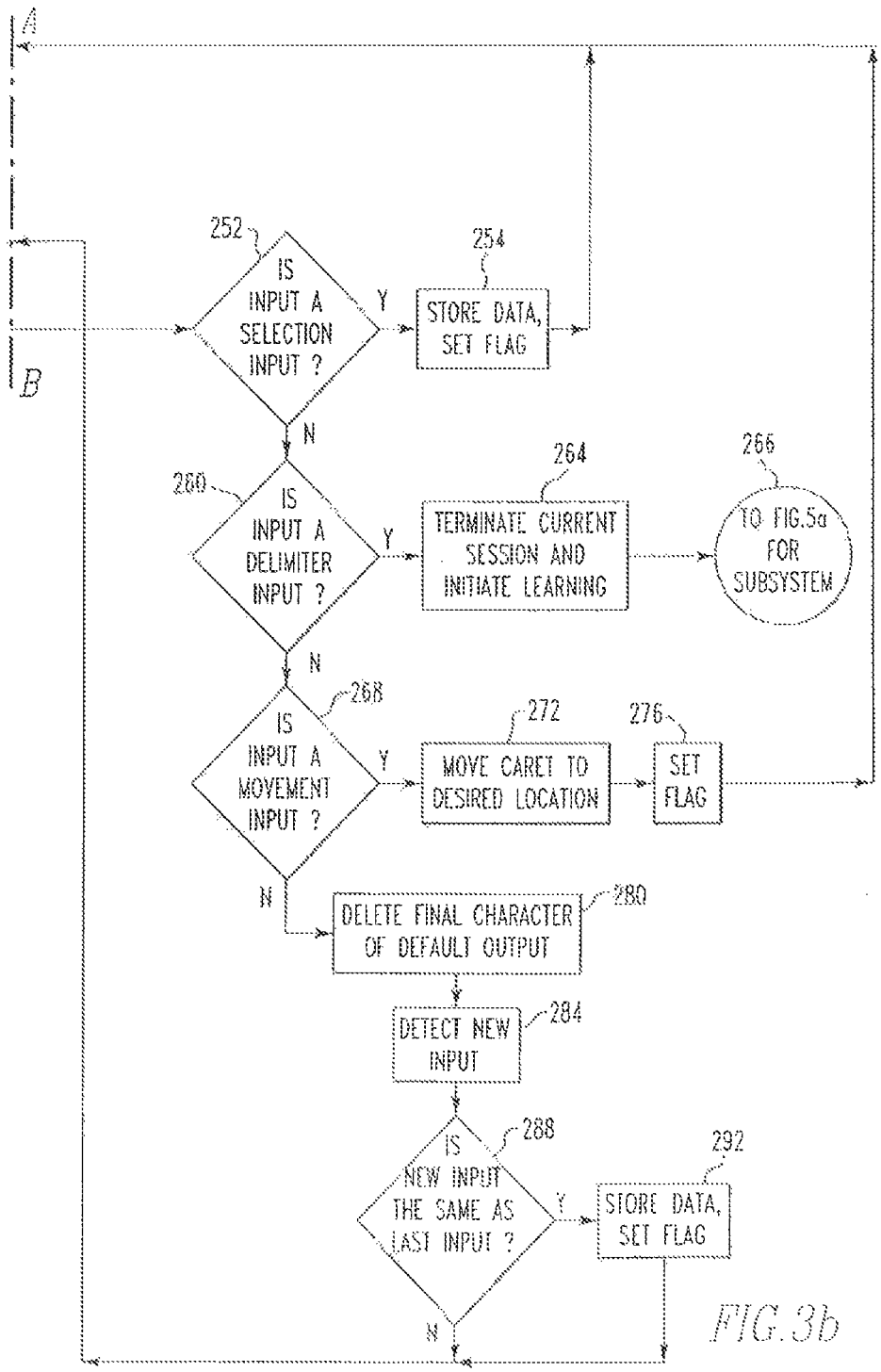

HANDHELD ELECTRONIC DEVICE WITH TEXT DISAMBIGUATION

CROSS-REFERENCE TO RELATED APPLICATIONS

This is a continuation of application Ser. No. 13/173,424 (U.S. Pat. No. 8,854,232), filed Jun. 30, 2011, which is a continuation of application Ser. No. 11/845,617 (U.S. Pat. No. 7,994,943), filed Aug. 27, 2007, which is a continuation of application Ser. No. 10/859,067 (U.S. Pat. No. 7,312,726), filed Jun. 2, 2004, all of which are incorporated herein by reference.

BACKGROUND OF THE INVENTION

Field of the Invention

The invention relates generally to handheld electronic devices and more particularly, to a handheld electronic device having a reduced keyboard and an input disambiguation function, and also relates to an associated method.

Background Information

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Roman alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys, eight have Roman letters assigned thereto. For instance, one of the keys includes the digit "2" as well as the letters "A", "B", and "C". Other known reduced keyboards have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", and the user desires to specify the letter "C", the user will press the key three times. While such multi-tap systems have been generally effective for their intended purposes, they nevertheless can require a relatively large number of key inputs compared with the number of characters that ultimately are output.

Another exemplary keystroke interpretation system would include key chording, of which various types exist. For instance, a particular character can be entered by pressing two keys in succession or by pressing and holding a first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. While these systems have likewise been generally effective for their intended purposes, such systems also have their own unique drawbacks.

Another keystroke interpretation system that has been employed is a software-based text disambiguation function. In such a system, a user typically presses keys to which one or more characters have been assigned, generally pressing each key one time for each desired letter, and the disambiguation software attempts to predict the intended input. Numerous such systems have been proposed, and while many have been generally effective for their intended purposes, shortcomings still exist.

It would be desirable to provide an improved handheld electronic device with a reduced keyboard that seeks to mimic a QWERTY keyboard experience or other particular keyboard experience. Such an improved handheld electronic device might also desirably be configured with enough features to enable text entry and other tasks with relative ease.

SUMMARY OF THE INVENTION

In view of the foregoing, an improved handheld electronic device includes a keypad in the form of a reduced QWERTY keyboard and is enabled with disambiguation software. As a user enters keystrokes, the device provides output in the form of a default output and a number of variants from which a user can choose. The output is based largely upon the frequency, i.e., the likelihood that a user intended a particular output, but various features of the device provide additional variants that are not based solely on frequency and rather are provided by various logic structures resident on the device. The device enables editing during text entry and also provides a learning function that allows the disambiguation function to adapt to provide a customized experience for the user. In certain predefined circumstances, the disambiguation function can be selectively disabled and an alternate keystroke interpretation system provided. Additionally, the device can facilitate the selection of variants by displaying a graphic of a special <NEXT> key of the keypad that enables a user to progressively select variants generally without changing the position of the user's hands on the device.

Accordingly, an aspect of the invention is to provide an improved handheld electronic device and an associated method, with the handheld electronic device including a reduced keyboard that seeks to simulate a QWERTY keyboard experience or another particular keyboard experience.

Another aspect of the invention is to provide an improved handheld electronic device and an associated method that provides a text input disambiguation function.

Another aspect of the invention is to provide an improved handheld electronic device and an associated method that employ a disambiguation function that, responsive to an ambiguous input, provides a number of proposed outputs according to relative frequency.

Another aspect of the invention is to provide an improved handheld electronic device and an associated method that provide a number of proposed outputs that can be based upon relative frequency and/or can result from various logic structures resident on the device.

Another aspect of the invention is to provide an improved handheld electronic device and an associated method that enable a custom experience by a user based upon various learning features and other features.

Another aspect of the invention is to provide an improved handheld electronic device and an associated method that employ a disambiguation function that can be selectively-disabled in certain predefined circumstances.

Another aspect of the invention is to provide an improved handheld electronic device and an associated method, wherein the handheld electronic device includes an input apparatus which facilitates the selection of variants with relative ease.

Another aspect of the invention is to provide an improved handheld electronic device and an associated method that employ a disambiguation function to disambiguate text input from a reduced QWERTY keyboard or other keyboard and that allow editing of the text input.

Accordingly, an aspect of the invention is to provide an improved method of disambiguating an input into a handheld electronic device, with the handheld electronic device including an input apparatus, an output apparatus, and a memory having a plurality of objects stored therein. The plurality of objects includes a plurality of language objects and a plurality of frequency objects, with each of at least a portion of the language objects of the plurality of language objects being associated with an associated frequency object of the plurality of frequency objects. The plurality of language objects includes a plurality of word objects and a plurality of N-gram objects, with substantially each N-gram object of the plurality of N-gram objects including at least a first character. The input apparatus includes a plurality of input members, with each of at least a portion of the input members of the plurality of input members having a plurality of characters assigned thereto. The general nature of the method can be stated as including detecting an ambiguous input including a number of input member actuations of a number of the input members of the plurality of input members, with each of at least a portion of the input members of the number of input members including a number of characters assigned thereto, and with at least one of the input members of the number of input members having a plurality of characters assigned thereto. The method further includes generating a number of prefix objects corresponding with the ambiguous input, with each prefix object of the number of prefix objects including a number of the characters of the number of the input members of the ambiguous input. The method further includes, for each prefix object of at least a portion of the number of prefix objects, seeking a corresponding language object of the plurality of language objects that corresponds with the prefix object. The method further includes generating a result by, for each prefix object of at least a portion of the number of prefix objects, the at least a portion being a quantity of one of zero and greater than zero, identifying a word object of the plurality of word objects, the identified word object corresponding with the prefix object, obtaining an associated frequency object of the plurality of frequency objects, the associated frequency object being associated with the identified word object and having a frequency value, and associating the frequency value of the associated frequency object with the prefix object. The method further includes, for at least a portion of the prefix objects of the result, generating an output set of the prefix objects sorted according to the frequency values associated therewith. The method additionally includes outputting an output including the prefix objects of at least a portion of the output set organized in descending order of frequency value.

Another aspect of the invention is to provide an improved handheld electronic device, the general nature of which can be stated as including a processor unit including a processor, an input apparatus, an output apparatus, and a memory having a plurality of objects and a routine stored therein. The plurality of objects includes a plurality of language objects and a plurality of frequency objects, with each of at least a portion of the language objects of the plurality of language objects being associated with an associated frequency object of the plurality of frequency objects. The plurality of language objects includes a plurality of word objects and a plurality of N-gram objects, with substantially each N-gram object of the plurality of N-gram objects including at least a first character. The input apparatus includes a plurality of input members, with each of at least a portion of the input members of the plurality of input members having a plurality of characters assigned thereto. The routine is adapted to detect an ambiguous input including a number of input member actuations of a number of the input members of the plurality of input members, with each of at least a portion of the input members of the number of input members including a number of characters assigned thereto, and with at least one of the input members of the number of input members having a plurality of characters assigned thereto. The routine is adapted to generate a number of prefix objects corresponding with the ambiguous input, with each prefix object of the number of prefix objects including a number of the characters of the number of the input members of the ambiguous input. For each prefix object of at least a portion of the number of prefix objects, the routine is adapted to seek a corresponding language object of the plurality of language objects that corresponds with the prefix object. The routine is adapted to generate a result by, for each prefix object of at least a portion of the number of prefix objects, the at least a portion being a quantity of one of zero and greater than zero, identifying a word object of the plurality of word objects, the identified word object corresponding with the prefix object, obtaining an associated frequency object of the plurality of frequency objects, the associated frequency object being associated with the identified word object and having a frequency value, and associating the frequency value of the associated frequency object with the prefix object. For at least a portion of the prefix objects of the result, the routine is adapted to generate an output set of the prefix objects sorted according to the frequency values associated therewith. The routine is adapted to output an output including the prefix objects of at least a portion of the output set organized in descending order of frequency value.

BRIEF DESCRIPTION OF THE DRAWINGS

A full understanding of the invention can be gained from the following Description of the Preferred Embodiment when read in conjunction with the accompanying drawings in which:

FIGS. 3a and 3b are an exemplary flowchart depicting certain aspects of a disambiguation function that can be executed on the handheld electronic device of FIG. 1;

Similar numerals refer to similar parts throughout the specification.

DESCRIPTION OF THE PREFERRED EMBODIMENT

Figure 1:
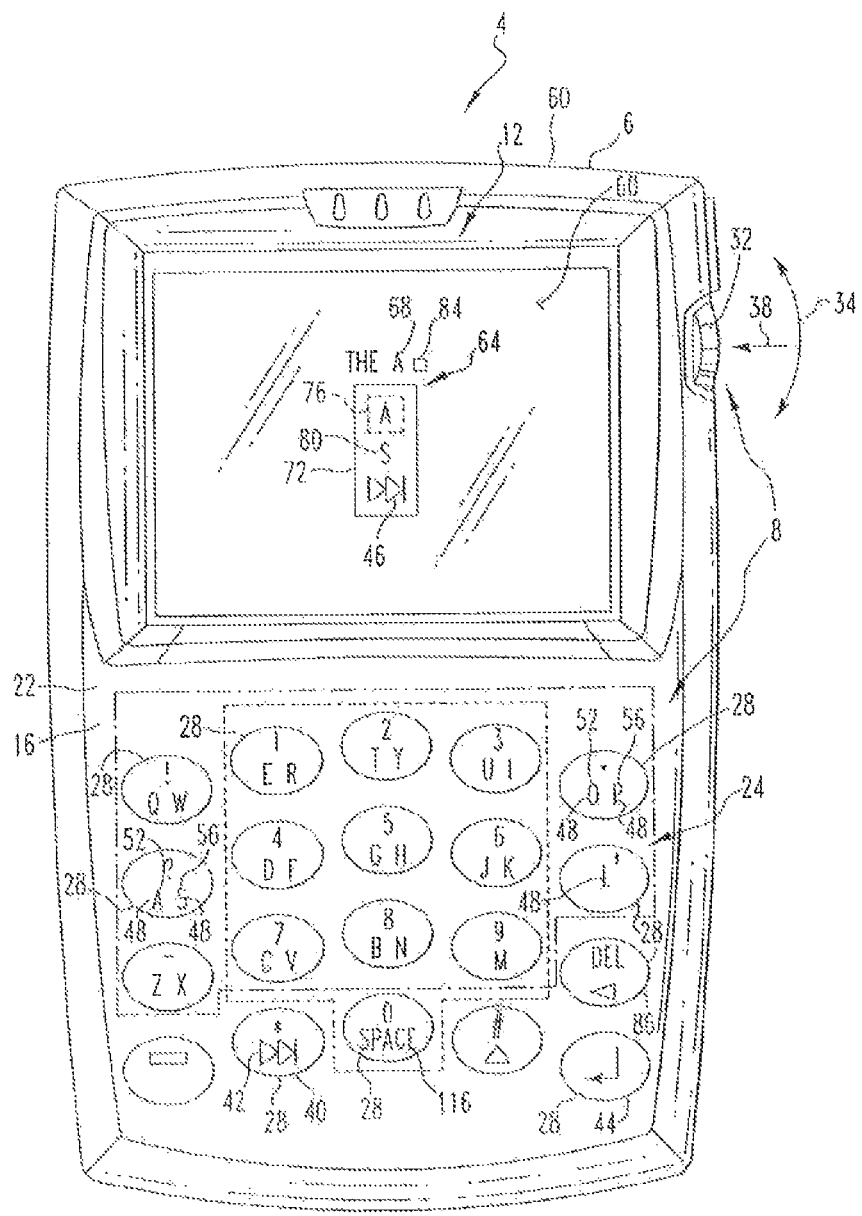
FIG. 1 is a top plan view of an improved handheld electronic device in accordance with the invention.
Figure 2:
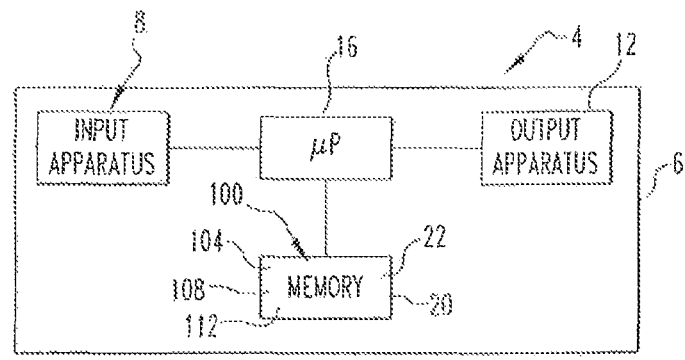
FIG. 2 is a schematic depiction of the improved handheld electronic device of FIG. 1.

An improved handheld electronic device 4 is indicated generally in FIG. 1 and is depicted schematically in FIG. 2. The exemplary handheld electronic device 4 includes a housing 6 upon which are disposed a processor unit that includes an input apparatus 8, an output apparatus 12, a processor 16, a memory 20, and at least a first routine. The processor 16 may be, for instance, and without limitation, a microprocessor (μP) and is responsive to inputs from the input apparatus 8 and provides output signals to the output apparatus 12. The processor 16 also interfaces with the memory 20. Examples of handheld electronic devices are included in U.S. Pat. Nos. 6,452,588 and 6,489,950, which are incorporated by record herein.

As can be understood from FIG. 1, the input apparatus 8 includes a keypad 24 and a thumbwheel 32. As will be described in greater detail below, the keypad 24 is in the exemplary form of a reduced QWERTY keyboard including a plurality of keys 28 that serve as input members. It is noted, however, that the keypad 24 may be of other configurations, such as an AZERTY keyboard, a QWERTZ keyboard, or other keyboard arrangement, whether presently known or unknown, and either reduced or not reduced. In this regard, the expression "reduced" and variations thereof, in the context of a keyboard, a keypad, or other arrangement of input members, shall refer broadly to an arrangement in which at least one of the input members has assigned thereto a plurality of characters within a given set, such as a plurality of letters, for example, in the set of Roman letters, for example, thereby rendering ambiguous an intended result of an actuation of the at least one of the input members.

In this regard, and as will be set forth below in greater detail, the system architecture of the handheld electronic device 4 advantageously is organized to be operable independent of the specific layout of the keypad 24. Accordingly, the system architecture of the handheld electronic device 4 can be employed in conjunction with virtually any keypad layout substantially without requiring any meaningful change in the system architecture. It is further noted that certain of the features set forth herein are usable on either or both of a reduced keyboard and a non-reduced keyboard.

The keys 28 are disposed on a front face of the housing 6, and the thumbwheel 32 is disposed at a side of the housing 6. The thumbwheel 32 can serve as another input member and is both rotatable, as is indicated by the arrow 34, to provide selection inputs to the processor 16, and also can be pressed in a direction generally toward the housing 6, as is indicated by the arrow 38, to provide another selection input to the processor 16.

Among the keys 28 of the keypad 24 are a <NEXT> key 40 and an <ENTER> key 44. The <NEXT> key 40 can be pressed to provide a selection input to the processor 16 and provides substantially the same selection input as is provided by a rotational input of the thumbwheel 32. Since the <NEXT> key 40 is provided adjacent a number of the other keys 28 of the keypad 24, the user can provide a selection input to the processor 16 substantially without moving the user's hands away from the keypad 24 during a text entry operation. As will be described in greater detail below, the <NEXT> key 40 additionally and advantageously includes a graphic 42 disposed thereon, and in certain circumstances the output apparatus 12 also displays a displayed graphic 46 thereon to identify the <NEXT> key 40 as being able to provide a selection input to the processor 16. In this regard, the displayed graphic 46 of the output apparatus 12 is substantially similar to the graphic 42 on the <NEXT> key 40 and thus identifies the <NEXT> key 40 as being capable of providing a desirable selection input to the processor 16.

As can further be seen in FIG. 1, many of the keys 28 include a number of characters 48 disposed thereon. As employed herein, the expression "a number of" and variations thereof shall refer broadly to any quantity, including a quantity of one, and in certain circumstances herein can also refer to a quantity of zero. In the exemplary depiction of the keypad 24, many of the keys 28 include two characters, such as including a first character 52 and a second character 56 assigned thereto. It is understood that the expression "characters" shall broadly be construed to include letters, digits, symbols and the like and can additionally include ideographic characters, components thereof, and the like.

One of the keys 28 of the keypad 24 includes as the characters 48 thereof the letters "Q" and "W", and an adjacent key 28 includes as the characters 48 thereof the letters "E" and "R". It can be seen that the arrangement of the characters 48 on the keys 28 of the keypad 24 is generally of a QWERTY arrangement, albeit with many of the keys 28 including two of the characters 48.

The output apparatus 12 includes a display 60 upon which can be provided an output 64. An exemplary output 64 is depicted on the display 60 in FIG. 1. The output 64 includes a text component 68 and a variant component 72. The variant component 72 includes a default portion 76 and a variant portion 80. The display 60 also includes a caret 84 that depicts generally where the next input from the input apparatus 8 will be received.

The text component 68 of the output 64 provides a depiction of the default portion 76 of the output 64 at a location on the display 60 where the text is being input. The variant component 72 is disposed generally in the vicinity of the text component 68 and provides, in addition to the default proposed output 76, a depiction of the various alternate text choices, i.e., alternates to the default proposed output 76, that are proposed by an input disambiguation function in response to an input sequence of key actuations of the keys 28.

As will be described in greater detail below, the default portion 76 is proposed by the disambiguation function as being the most likely disambiguated interpretation of the ambiguous input provided by the user. The variant portion 80 includes a predetermined quantity of alternate proposed interpretations of the same ambiguous input from which the user can select, if desired. The displayed graphic 46 typically is provided in the variant component 72 in the vicinity of the variant portion 80, although it is understood that the displayed graphic 46 could be provided in other locations and in other fashions without departing from the concept of the invention. It is also noted that the exemplary variant portion 80 is depicted herein as extending vertically below the default portion 76, but it is understood that numerous other arrangements could be provided without departing from the concept of the invention.

Among the keys 28 of the keypad 24 additionally is a <DELETE> key 86 that can be provided to delete a text entry. As will be described in greater detail below, the <DELETE> key 86 can also be employed in providing an alternation input to the processor 16 for use by the disambiguation function.

Figure 2A:
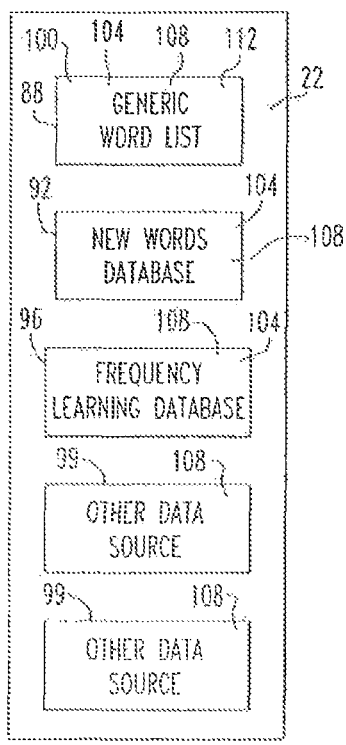
FIG. 2a is a schematic depiction of a portion of the handheld electronic device of FIG. 2.

The memory 20 is depicted schematically in FIG. 2A. The memory 20 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 20 additionally includes a number of routines depicted generally with the numeral 22 for the processing of data. The routines 22 can be in any of a variety of forms such as, without limitation, software, firmware, and the like. As will be explained in greater detail below, the routines 22 include the aforementioned disambiguation function as an application, as well as other routines.

As can be understood from FIG. 2A, the memory 20 additionally includes data stored and/or organized in a number of tables, sets, lists, and/or otherwise. Specifically, the memory 20 includes a generic word list 88, a new words database 92, and a frequency learning database 96. Stored within the various areas of the memory 20 are a number of language objects 100 and frequency objects 104. The language objects 100 generally are each associated with an associated frequency object 104. The language objects 100 include a plurality of word objects 108 and a plurality of N-gram objects 112. The word objects 108 are generally representative of complete words within the language or custom words stored in the memory 20. For instance, if the language stored in the memory 20 is, for example, English, generally each word object 108 would represent a word in the English language or would represent a custom word.

Associated with substantially each word object 108 is a frequency object 104 having a frequency value that is indicative of the relative frequency within the relevant language of the given word represented by the word object 108. In this regard, the generic word list 88 includes a corpus of word objects 108 and associated frequency objects 104 that together are representative of a wide variety of words and their relative frequency within a given vernacular of, for instance, a given language. The generic word list 88 can be derived in any of a wide variety of fashions, such as by analyzing numerous texts and other language sources to determine the various words within the language sources as well as their relative probabilities, i.e., relative frequencies, of occurrences of the various words within the language sources.

The N-gram objects 112 stored within the generic word list 88 are short strings of characters within the relevant language typically, for example, one to three characters in length, and typically represent word fragments within the relevant language, although certain of the N-gram objects 112 additionally can themselves be words. However, to the extent that an N-gram object 112 also is a word within the relevant language, the same word likely would be separately stored as a word object 108 within the generic word list 88. As employed herein, the expression "string" and variations thereof shall refer broadly to an object having one or more characters or components, and can refer to any of a complete word, a fragment of a word, a custom word or expression, and the like.

In the present exemplary embodiment of the handheld electronic device 4, the N-gram objects 112 include 1-gram objects, i.e., string objects that are one character in length, 2-gram objects, i.e., string objects that are two characters in length, and 3-gram objects, i.e., string objects that are three characters in length, all of which are collectively referred to as N-gram objects 112. Substantially each N-gram object 112 in the generic word list 88 is similarly associated with an associated frequency object 104 stored within the generic word list 88, but the frequency object 104 associated with a given N-gram object 112 has a frequency value that indicates the relative probability that the character string represented by the particular N-gram object 112 exists at any location within any word of the relevant language. The N-gram objects 112 and the associated frequency objects 104 are a part of the corpus of the generic word list 88 and are obtained in a fashion similar to the way in which the word object 108 and the associated frequency objects 104 are obtained, although the analysis performed in obtaining the N-gram objects 112 will be slightly different because it will involve analysis of the various character strings within the various words instead of relying primarily on the relative occurrence of a given word.

The present exemplary embodiment of the handheld electronic device 4, with its exemplary language being the English language, includes twenty-six 1-gram N-gram objects 112, i.e., one 1-gram object for each of the twenty-six letters in the Roman alphabet upon which the English language is based, and further includes 676 2-gram N-gram objects 112, i.e., twenty-six squared, representing each two-letter permutation of the twenty-six letters within the Roman alphabet.

The N-gram objects 112 also include a certain quantity of 3-gram N-gram objects 112, primarily those that have a relatively high frequency within the relevant language. The exemplary embodiment of the handheld electronic device 4 includes fewer than all of the three-letter permutations of the twenty-six letters of the Roman alphabet due to considerations of data storage size, and also because the 2-gram N-gram objects 112 can already provide a meaningful amount of information regarding the relevant language. As will be set forth in greater detail below, the N-gram objects 112 and their associated frequency objects 104 provide frequency data that can be attributed to character strings for which a corresponding word object 108 cannot be identified or has not been identified, and typically is employed as a fallback data source, although this need not be exclusively the case.

In the present exemplary embodiment, the language objects 100 and the frequency objects 104 are maintained substantially inviolate in the generic word list 88, meaning that the basic language corpus remains substantially unaltered within the generic word list 88, and the learning functions that are provided by the handheld electronic device 4 and that are described below operate in conjunction with other objects that are generally stored elsewhere in memory 20, such as, for example, in the new words database 92 and the frequency learning database 96.

The new words database 92 and the frequency learning database 96 store additional word objects 108 and associated frequency objects 104 in order to provide to a user a customized experience in which words and the like that are used relatively more frequently by a user will be associated with relatively higher frequency values than might otherwise be reflected in the generic word list 88. More particularly, the new words database 92 includes word objects 108 that are user-defined and that generally are not found among the word objects 108 of the generic word list 88. Each word object 108 in the new words database 92 has associated therewith an associated frequency object 104 that is also stored in the new words database 92. The frequency learning database 96 stores word objects 108 and associated frequency objects 104 that are indicative of relatively more frequent usage of such words by a user than would be reflected in the generic word list 88. As such, the new words database 92 and the frequency learning database 96 provide two learning functions, that is, they together provide the ability to learn new words as well as the ability to learn altered frequency values for known words.

FIGS. 3a and 3b depict in an exemplary fashion the general operation of certain aspects of the disambiguation function of the handheld electronic device 4. Additional features, functions, and the like are depicted and described elsewhere.

An input is detected, as at 204, and the input can be any type of actuation or other operation as to any portion of the input apparatus 8. A typical input would include, for instance, an actuation of a key 28 having a number of characters 48 thereon, or any other type of actuation or manipulation of the input apparatus 8.

Upon detection at 204 of an input, a timer is reset at 208. The use of the timer will be described in greater detail below.

The disambiguation function then determines, as at 212, whether the current input is an operational input, such as a selection input, a delimiter input, a movement input, an alternation input, or, for instance, any other input that does not constitute an actuation of a key 28 having a number of characters 48 thereon. If the input is determined at 212 to not be an operational input, processing continues at 216 by adding the input to the current input sequence which may or may not already include an input.

Many of the inputs detected at 204 are employed in generating input sequences as to which the disambiguation function will be executed. An input sequence is built up in each "session" with each actuation of a key 28 having a number of characters 48 thereon. Since an input sequence typically will be made up of at least one actuation of a key 28 having a plurality of characters 48 thereon, the input sequence will be ambiguous. When a word, for example, is completed, the current session is ended and a new session is initiated.

An input sequence is gradually built up on the handheld electronic device 4 with each successive actuation of a key 28 during any given session. Specifically, once a delimiter input is detected during any given session, the session is terminated and a new session is initiated. Each input resulting from an actuation of one of the keys 28 having a number of the characters 48 associated therewith is sequentially added to the current input sequence. As the input sequence grows during a given session, the disambiguation function generally is executed with each actuation of a key 28, i.e., an input, and as to the entire input sequence. Stated otherwise, within a given session, the growing input sequence is attempted to be disambiguated as a unit by the disambiguation function with each successive actuation of the various keys 28.

Once a current input representing a most recent actuation of the one of the keys 28 having a number of the characters 48 assigned thereto has been added to the current input sequence within the current session, as at 216 in FIG. 3a, the disambiguation function generates, as at 220, substantially all of the permutations of the characters 48 assigned to the various keys 28 that were actuated in generating the input sequence. In this regard, the "permutations" refer to the various strings that can result from the characters 48 of each actuated key 28 limited by the order in which the keys 28 were actuated. The various permutations of the characters 48 in the input sequence are employed as prefix objects.

For instance, if the current input sequence within the current session is the ambiguous input of the keys "AS" and "OP", the various permutations of the first character 52 and the second character 56 of each of the two keys 28, when considered in the sequence in which the keys 28 were actuated, would be "SO", "SP", "AP", and "AO", and each of these is a prefix object that is generated, as at 220, with respect to the current input sequence. As will be explained in greater detail below, the disambiguation function seeks to identify for each prefix object one of the word objects 108 for which the prefix object would be a prefix.

For each generated prefix object, the memory 20 is consulted, as at 224, to identify, if possible, for each prefix object one of the word objects 108 in the memory 20 that corresponds with the prefix object, meaning that the sequence of letters represented by the prefix object would be either a prefix of the identified word object 108 or would be substantially identical to the entirety of the word object 108. Further in this regard, the word object 108 that is sought to be identified is the highest frequency word object 108. That is, the disambiguation function seeks to identify the word object 108 that corresponds with the prefix object and that also is associated with a frequency object 104 having a relatively higher frequency value than any of the other frequency objects 104 associated with the other word objects 108 that correspond with the prefix object.

It is noted in this regard that the word objects 108 in the generic word list 88 are generally organized in data tables that correspond with the first two letters of various words. For instance, the data table associated with the prefix "CO" would include all of the words such as "CODE", "COIN", "COMMUNICATION", and the like. Depending upon the quantity of word objects 108 within any given data table, the data table may additionally include sub-data tables within which word objects 108 are organized by prefixes that are three characters or more in length. Continuing onward with the foregoing example, if the "CO" data table included, for instance, more than 256 word objects 108, the "GO" data table would additionally include one or more sub-data tables of word objects 108 corresponding with the most frequently appearing three-letter prefixes. By way of example, therefore, the "CO" data table may also include a "COM" sub-data table and a "CON" sub-data table. If a sub-data table includes more than the predetermined number of word objects 108, for example a quantity of 256, the sub-data table may include further sub-data tables, such as might be organized according to four-letter prefixes. It is noted that the aforementioned quantity of 256 of the word objects 108 corresponds with the greatest numerical value that can be stored within one byte of the memory 20.

Accordingly, when, at 224, each prefix object is sought to be used to identify a corresponding word object 108, and for instance the instant prefix object is "AP", the "AP" data table will be consulted. Since all of the word objects 108 in the "AP" data table will correspond with the prefix object "AP", the word object 108 in the "AP" data table with which is associated a frequency object 104 having a frequency value relatively higher than any of the other frequency objects 104 in the "AP" data table is identified. The identified word object 108 and the associated frequency object 104 are then stored in a result register that serves as a result of the various comparisons of the generated prefix objects with the contents of the memory 20.

It is noted that one or more, or possibly all, of the prefix objects will be prefix objects for which a corresponding word object 108 is not identified in the memory 20. Such prefix objects are considered to be orphan prefix objects and are separately stored or are otherwise retained for possible future use. In this regard, it is noted that many or all of the prefix objects can become orphan objects if, for instance, the user is trying to enter a new word or, for example, if the user has mis-keyed and no word corresponds with the mis-keyed input.

Once the result has been obtained at 224, the disambiguation function determines, as at 228, whether artificial variants should be generated. In order to determine the need for artificial variants, the process at 228 branches, as at 230, to the artificial variant process depicted generally in FIG. 4 and beginning with the numeral 304. The disambiguation function then determines, as at 308, whether any of the prefix objects in the result correspond with what had been the default output 76 prior to detection of the current key input. If a prefix object in the result corresponds with the previous default output, this means that the current input sequence corresponds with a word object 108 and, necessarily, the previous default output also corresponded with a word object 108 during the previous disambiguation cycle within the current session.

The next point of analysis is to determine, as at 310, whether the previous default output was made the default output because of a selection input, such as would have caused the setting of a flag, such as at 254 of FIG. 3b, discussed in greater detail below. In the event that the previous default output was not the result of a selection input, no artificial variants are needed, and the process returns, as at 312, to the main process at 232. However, if it is determined at 310 that the previous default output was the result of a selection input, then artificial variants are generated, as at 316.

More specifically, each of the artificial variants generated at 316 includes the previous default output plus one of the characters 48 assigned to the key 28 of the current input. As such, if the key 28 of the current input has two characters, i.e., a first character 52 and a second character 56, two artificial variants will be generated at 316. One of the artificial variants will include the previous default output plus the first character 52. The other artificial variant will include the previous default output plus the second character 56.

However, if it is determined at 308 that none of the prefix objects in the result correspond with the previous default output, it is next necessary to determine, as at 314, whether the previous default output had corresponded with a word object 108 during the previous disambiguation cycle within the current session. If the answer to the inquiry at 314 is no, it is still necessary to determine, as at 318, whether the previous default output was made the default output because of a selection input, such as would have caused the setting of the flag. In the event that the previous default output was not the result of a selection input, no artificial variants are needed, and the process returns, as at 312, to the main process at 232. However, if it is determined at 318 that the previous default output was the result of a selection input, then artificial variants are generated, as at 316.

On the other hand, if it is determined that the answer to the inquiry at 314 is yes, meaning that the previous default output had corresponded with a word object 108, but with the current input the previous default output combined with the current input has ceased to correspond with any word object 108, then artificial variants are generated, again as at 316.

After the artificial variants are generated at 316, the method then determines, as at 320, whether the result includes any prefix objects at all. If not, processing returns, as at 312, to the main process at 232. However, if it is determined at 320 that the result includes at least a first prefix object, meaning that the current input sequence corresponds with a word object 108, processing is transferred to 324 where an additional artificial variant is created. Specifically, the prefix object of the result with which is associated the frequency object 104 having the relatively highest frequency value among the other frequency objects 104 in the result is identified, and the artificial variant is created by deleting the final character 48 from the identified prefix object and replacing it with an opposite character 48 on the same key 28 of the current input that generated the final character 48 of the identified prefix object. In the event that the specific key 28 has more than two characters 48 assigned thereto, each such opposite character 48 will be used to generate an additional artificial variant.

Figure 4:
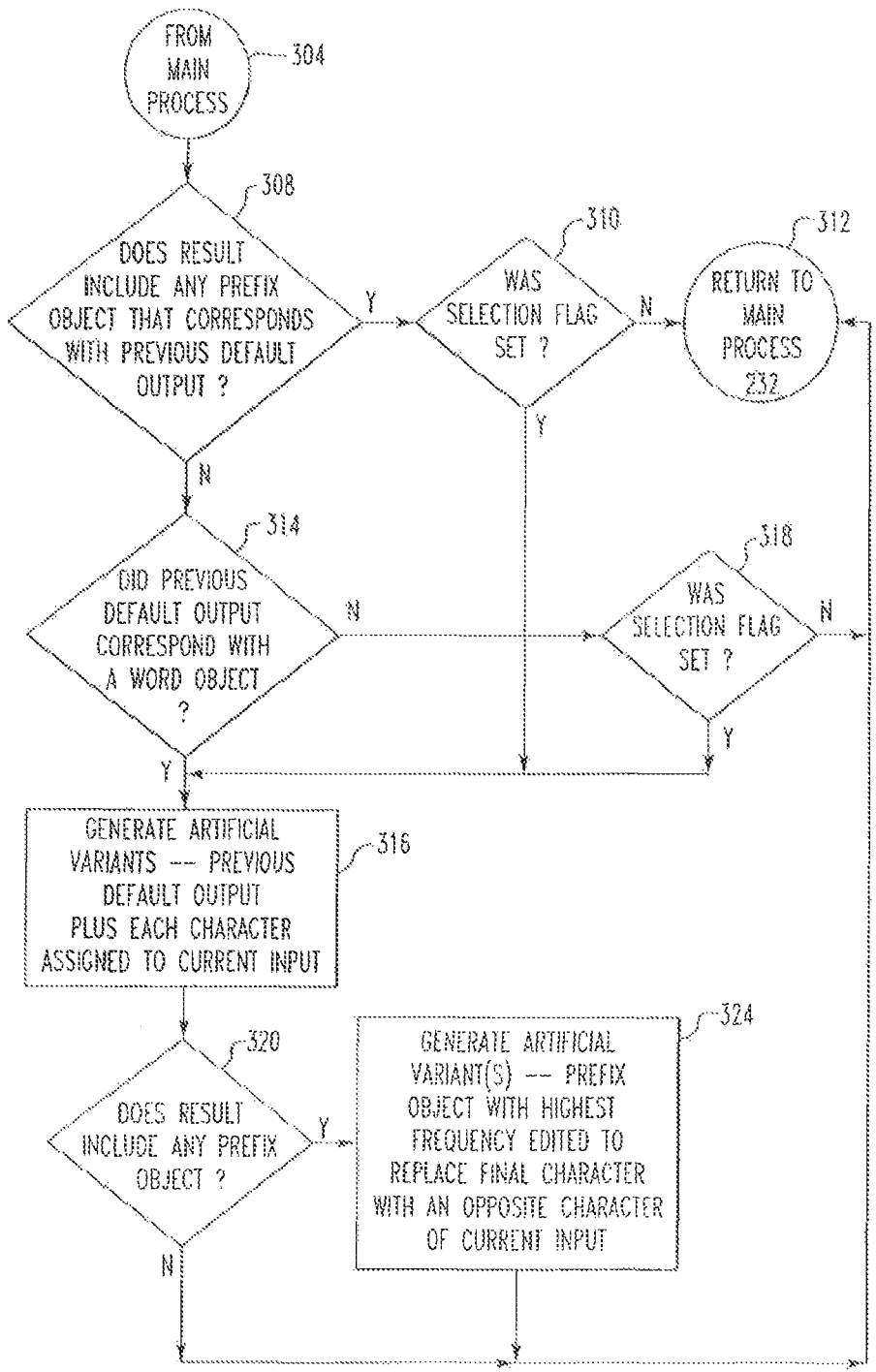
FIG. 4 is another exemplary flowchart depicting certain aspects of a disambiguation function that can be executed on the handheld electronic device by which certain output variants can be provided to the user.

Once the need for artificial variants has been identified, as at 228, and such artificial variants have been generated, as in FIG. 4 and as described above, processing continues, as at 232, where duplicate word objects 108 associated with relatively lower frequency values are deleted from the result. Such a duplicate word object 108 could be generated, for instance, by the frequency learning database 96, as will be set forth in greater detail below. If a word object 108 in the result matches one of the artificial variants, the word object 108 and its associated frequency object 104 generally will be removed from the result because the artificial variant will be assigned a preferred status in the output 64, likely in a position preferred to any word object 108 that might have been identified.

Once the duplicate word objects 108 and the associated frequency objects 104 have been removed at 232, the remaining prefix objects are arranged, as at 236, in an output set in decreasing order of frequency value. The orphan prefix objects mentioned above may also be added to the output set, albeit at positions of relatively lower frequency value than any prefix object for which a corresponding word object 108 was found. It is also necessary to ensure that the artificial variants, if they have been created, are placed at a preferred position in the output set. It is understood that artificial variants may, but need not necessarily be, given a position of preference, i.e., assigned a relatively higher priority or frequency, than prefix objects of the result.

If it is determined, as at 240, that the flag has been set, meaning that a user has made a selection input, either through an express selection input or through an alternation input of a movement input, then the default output 76 is considered to be "locked," meaning that the selected variant will be the default prefix until the end of the session. If it is determined at 240 that the flag has been set, the processing will proceed to 244 where the contents of the output set will be altered, if needed, to provide as the default output 76 an output that includes the selected prefix object, whether it corresponds with a word object 108 or is an artificial variant. In this regard, it is understood that the flag can be set additional times during a session, in which case the selected prefix associated with resetting of the flag thereafter becomes the "locked" default output 76 until the end of the session or until another selection input is detected.

Figure 6:
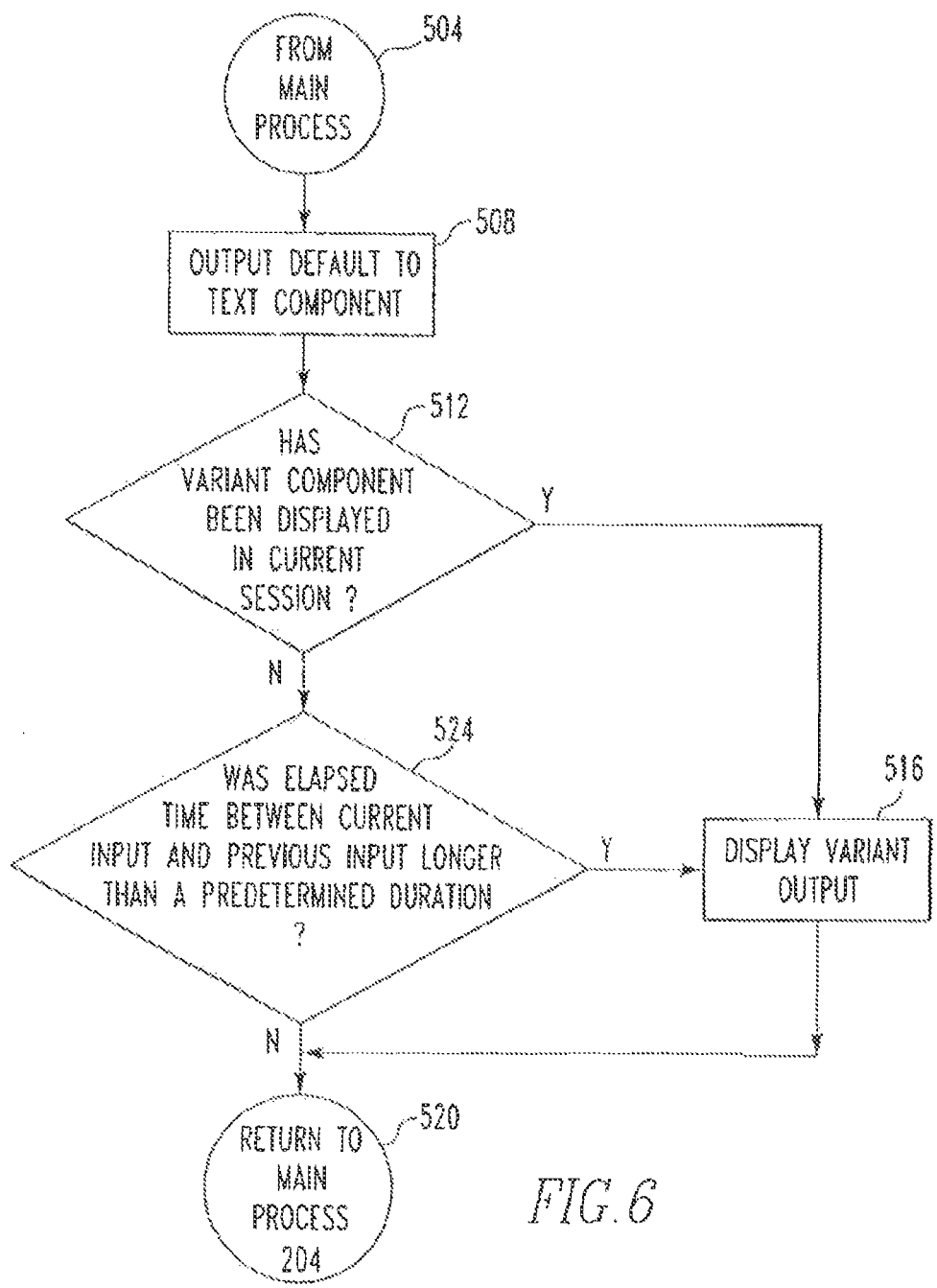
FIG. 6 is another exemplary flowchart depicting certain aspects of a method by which various display formats can be provided on the handheld electronic device.

Processing then continues, as at 248, to an output step after which an output 64 is generated as described above. More specifically, processing proceeds, as at 250, to the subsystem depicted generally in FIG. 6 and described below. Processing thereafter continues at 204 where additional input is detected. On the other hand, if it is determined at 240 that the flag has not been set, then processing goes directly to 248 without the alteration of the contents of the output set at 244.

The handheld electronic device 4 may be configured such that any orphan prefix object that is included in an output 64 but that is not selected with the next input is suspended. This may be limited to orphan prefix objects appearing in the variant portion 80 or may apply to orphan prefix objects anywhere in the output 64. The handheld electronic device 4 may also be configured to similarly suspend artificial variants in similar circumstances. A reason for such suspension is that each such orphan prefix object and/or artificial variant, as appropriate, may spawn a quantity of offspring orphan prefix objects equal to the quantity of characters 48 on a key 28 of the next input. That is, each offspring will include the parent orphan prefix object or artificial variant plus one of the characters 48 of the key 28 of the next input. Since orphan prefix objects and artificial variants substantially do not have correspondence with a word object 108, spawned offspring objects from parent orphan prefix objects and artificial variants likewise will not have correspondence with a word object 108. Such suspended orphan prefix objects and/or artificial variants may be considered to be suspended, as compared with being wholly eliminated, since such suspended orphan prefix objects and/or artificial variants may reappear later as parents of spawned orphan prefix objects and/or artificial variants, as will be explained below.

If the detected input is determined, as at 212, to be an operational input, processing then continues to determine the specific nature of the operational input. For instance, if it is determined, as at 252, that the current input is a selection input, processing continues at 254. At 254, the word object 108 and the associated frequency object 104 of the default portion 76 of the output 64, as well as the word object 108 and the associated frequency object 104 of the portion of the variant output 80 that was selected by the selection input, are stored in a temporary learning data register. Additionally, the flag is set. Processing then returns to detection of additional inputs as at 204.

Figure 5A:
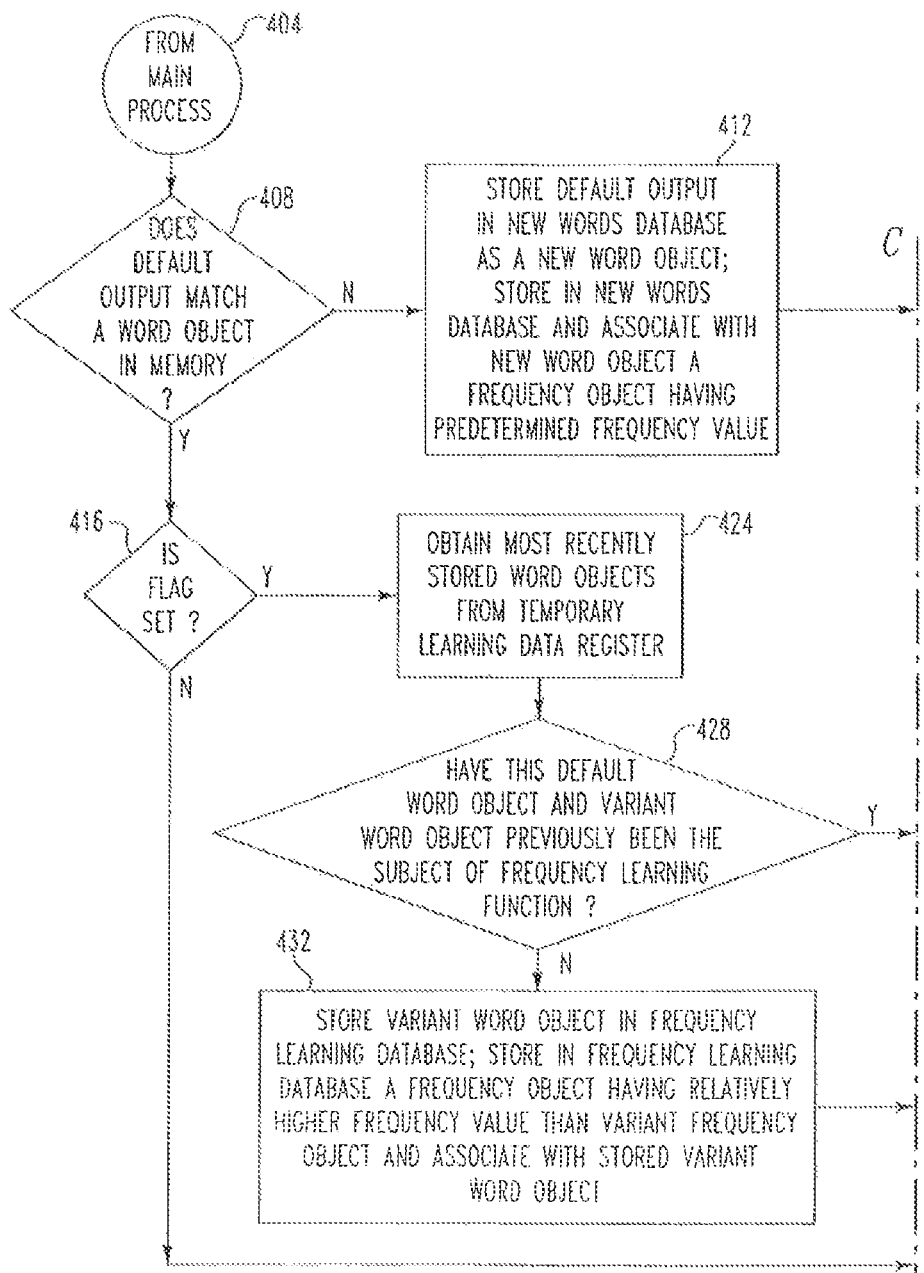
FIGS. 5a and 5b are another exemplary flowchart depicting certain aspects of the learning method that can be executed on the handheld electronic device.

If it is determined, as at 260, that the input is a delimiter input, processing continues at 264 where the current session is terminated and processing is transferred, as at 266, to the learning function subsystem, as at 404 of FIG. 5a. A delimiter input would include, for example, the actuation of a <SPACE> key 116, which would both enter a delimiter symbol and would add a space at the end of the word, actuation of the <ENTER> key 44, which might similarly enter a delimiter input and enter a space, and by a translation of the thumbwheel 32, such as is indicated by the arrow 38, which might enter a delimiter input without additionally entering a space.

It is first determined, as at 408, whether the default output at the time of the detection of the delimiter input at 260 matches a word object 108 in the memory 20. If it does not, this means that the default output is a user-created output that should be added to the new words database 92 for future use. In such a circumstance processing then proceeds to 412 where the default output is stored in the new words database 92 as a new word object 108. Additionally, a frequency object 104 is stored in the new words database 92 and is associated with the aforementioned new word object 108. The new frequency object 104 is given a relatively high frequency value, typically within the upper one-fourth or one-third of a predetermined range of possible frequency values.

In this regard, frequency objects 104 are given an absolute frequency value generally in the range of zero to 65,535. The maximum value represents the largest number that can be stored within two bytes of the memory 20. The new frequency object 104 that is stored in the new words database 92 is assigned an absolute frequency value within the upper one-fourth or one-third of this range, particularly since the new word was used by a user and is likely to be used again.

With further regard to frequency object 104, it is noted that within a given data table, such as the "CO" data table mentioned above, the absolute frequency value is stored only for the frequency object 104 having the highest frequency value within the data table. All of the other frequency objects 104 in the same data table have frequency values stored as percentage values normalized to the aforementioned maximum absolute frequency value. That is, after identification of the frequency object 104 having the highest frequency value within a given data table, all of the other frequency objects 104 in the same data table are assigned a percentage of the absolute maximum value, which represents the ratio of the relatively smaller absolute frequency value of a particular frequency object 104 to the absolute frequency value of the aforementioned highest value frequency object 104. Advantageously, such percentage values can be stored within a single byte of memory 20, thus saving storage space within the handheld electronic device 4.

Upon creation of the new word object 108 and the new frequency object 104, and storage thereof within the new words database 92, processing is transferred to 420 where the learning process is terminated. Processing is then returned to the main process, as at 204.

If at 408 it is determined that the word object 108 in the default output 76 matches a word object 108 within the memory 20, processing then continues at 416 where it is determined whether the aforementioned flag has been set, such as occurs upon the detection of a selection input, an alternation input, or a movement input, by way of example. If it turns out that the flag has not been set, this means that the user has not expressed a preference for a variant prefix object over a default prefix object, and no need for frequency learning has arisen. In such a circumstance, processing continues at 420 where the learning process is terminated. Processing then returns to tire main process at 254.

However, if it is determined at 416 that the flag has been set, the processor 16 retrieves from the temporary learning data register the most recently saved default and variant word objects 108, along with their associated frequency objects 104. It is then determined, as at 428, whether the default and variant word objects 108 had previously been the subject of a frequency learning operation. This might be determined, for instance, by determining whether the variant word object 108 and the associated frequency object 104 were obtained from the frequency learning database 96. If the default and variant word objects 108 had not previously been the subject of a frequency learning operation, processing continues, as at 432, where the variant word object 108 is stored in the frequency learning database 96, and a revised frequency object 104 is generated having a frequency value greater than that of the frequency object 104 that previously had been associated with the variant word object 108. In the present exemplary circumstance, i.e., where the default word object 108 and the variant word object 108 are experiencing their first frequency learning operation, the revised frequency object 104 may, for instance, be given a frequency value equal to the sum of the frequency value of the frequency object 104 previously associated with the variant word object 108 plus one-half the difference between the frequency value of the frequency object 104 associated with the default word object 108 and the frequency value of the frequency object 104 previously associated with the variant word object 108. Upon storing the variant word object 108 and the revised frequency object 104 in the frequency learning database 96, processing continues at 420 where the learning process is terminated and processing returns to the main process, as at 254.

If it is determined at 428 that that default word object 108 and the variant word object 108 had previously been the subject of a frequency learning operation, processing continues to 436 where the revised frequency object 104 is instead given a frequency value higher than the frequency value of the frequency object 104 associated with the default word object 108. After storage of the variant word object 108 and the revised frequency object 104 in the frequency learning database 96, processing continues to 420 where the learning process is terminated, and processing then returns to the main process, as at 254.

With further regard to the learning function, it is noted that the learning function additionally detects whether both the default word object 108 and the variant word object 108 were obtained from the frequency learning database 96. In this regard, when word objects 108 are identified, as at 224, for correspondence with generated prefix objects, all of the data sources in the memory 20 are polled for such corresponding word objects 108 and corresponding frequency objects 104. Since the frequency learning database 96 stores word objects 108 that also are stored either in the generic word list 88 or the new words database 92, the word object 108 and the associated frequency object 104 that are obtained from the frequency learning database 96 typically are duplicates of word objects 108 that have already been obtained from the generic word list 88 or the new words database 92. However, the associated frequency object 104 obtained from the frequency learning database 96 typically has a frequency value that is of a greater magnitude than that of the associated frequency object 104 that had been obtained from the generic word list 88. This reflects the nature of the frequency learning database 96 as imparting to a frequently used word object 108 a relatively greater frequency value than it otherwise would have in the generic word list 88.

Figure 5B:
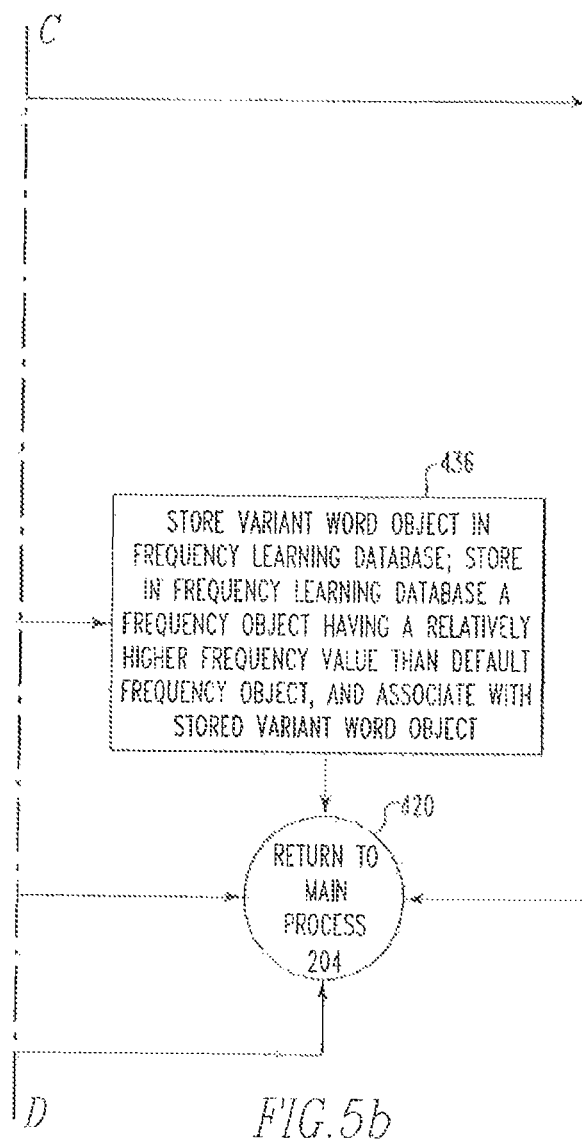

It thus can be seen that the learning function indicated in FIGS. 5a and 5b and described above is generally not initiated until a delimiter input is detected, meaning that learning occurs only once for each session. Additionally, if the final default output is not a user-defined new word, the word objects 108 that are the subject of the frequency learning function are the word objects 108 which were associated with the default output 76 and the selected variant output 80 at the time when the selection occurred, rather than necessarily being related to the object that ultimately resulted as the default output at the end of the session. Also, if numerous learnable events occurred during a single session, the frequency learning function operates only on the word objects 108 that were associated with the final learnable event, i.e., a selection event, an alternation event, or a movement event, prior to termination of the current session.

With further regard to the identification of various word objects 108 for correspondence with generated prefix objects, it is noted that the memory 20 can include a number of additional data sources 99 in addition to the generic word list 88, the new words database 92, and the frequency learning database 96, all of which can be considered linguistic sources. An exemplary two other data sources 99 are depicted in FIG. 2a, it being understood that the memory 20 might include any number of other data sources 99. The other data sources 99 might include, for example, an address database, a speed-text database, or any other data source without limitation. An exemplary speed-text database might include, for example, sets of words or expressions or other data that are each associated with, for example, a character string that may be abbreviated. For example, a speed-text database might associate the string "br" with the set of words "Best Regards", with the intention that a user can type the string "br" and receive the output "Best Regards".

In seeking to identify word objects 108 that correspond with a given prefix object, the handheld electronic device 4 may poll all of the data sources in the memory 20. For instance the handheld electronic device 4 may poll the generic word list 88, the new words database 92, the frequency learning database 96, and the other data sources 99 to identify word objects 108 that correspond with the prefix object. The contents of the other data sources 99 may be treated as word objects 108, and the processor 16 may generate frequency objects 104 that will be associated with such word objects 108 and to which may be assigned a frequency value in, for example, the upper one-third or one-fourth of the aforementioned frequency range. Assuming that the assigned frequency value is sufficiently high, the string "br", for example, would typically be output to the display 60. If a delimiter input is detected with respect to the portion of the output having the association with the word object 108 in the speed-text database, for instance "br", the user would receive the output "Best Regards", it being understood that the user might also have entered a selection input as to the exemplary string "br".

The contents of any of the other data sources 99 may be treated as word objects 108 and maybe associated with generated frequency objects 104 having the assigned frequency value in the aforementioned upper portion of the frequency range. After such word objects 108 are identified, the new word learning function can, if appropriate, act upon such word objects 108 in the fashion set forth above.

Again regarding FIG. 3a, when processing proceeds to the filtration step, as at 232, and the duplicate word objects 108 and the associated frequency objects 104 having relatively lower frequency values are filtered, the remaining results may include a variant word object 108 and a default word object 108, both of which were obtained from the frequency learning database 96. In such a situation, it can be envisioned that if a user repetitively and alternately uses one word then the other word, over time the frequency objects 104 associated with such words will increase well beyond the aforementioned maximum absolute frequency value for a frequency object 104. Accordingly, if it is determined that both the default word object 108 and the variant word object 108 in the learning function were obtained from the frequency learning database 96, instead of storing the variant word object 108 in the frequency learning database 96 and associating it with a frequency object 104 having a relatively increased frequency value, the learning function stores the default word object 108 and associates it with a revised frequency object 104 having a frequency value that is relatively lower than that of the frequency object 104 that is associated with the variant word object 108. Such a scheme advantageously avoids excessive and unnecessary increases in frequency value.

If it is determined, such as at 268, that the current input is a movement input, such as would be employed when a user is seeking to edit an object, either a completed word or a prefix object within the current session, the caret 84 is moved, as at 272, to the desired location, and the flag is set, as at 276. Processing then returns to where additional inputs can be detected, as at 204.

In this regard, it is understood that various types of movement inputs can be detected from the input apparatus 8. For instance, a rotation of the thumbwheel 32, such as is indicated by the arrow 34 of FIG. 1, could provide a movement input, as could the actuation of the <NEXT> key 40, or other such input, potentially in combination with other devices in the input apparatus 8. In the instance where such a movement input is detected, such as in the circumstance of an editing input, the movement input is additionally detected as a selection input. Accordingly, and as is the case with a selection input such as is detected at 252, the selected variant is effectively locked with respect to the default portion 76 of the output 64. Any default output 76 during the same session will necessarily include the previously selected variant.

In the context of editing, however, the particular displayed object that is being edited is effectively locked except as to the character that is being edited. In this regard, therefore, the other characters of the object being edited, i.e., the characters that are not being edited, are maintained and are employed as a context for identifying additional word objects 108 and the like that correspond with the object being edited. Were this not the case, a user seeking to edit a letter in the middle of a word otherwise likely would see as a new output 64 numerous objects that bear little or no resemblance to the characters of the object being edited since, in the absence of maintaining such context, an entirely new set of prefix objects including all of the permutations of the characters of the various keystrokes of the object being edited would have been generated. New word objects 108 would have been identified as corresponding with the new prefix objects, all of which could significantly change the output 64 merely upon the editing of a single character. By maintaining the other characters currently in the object being edited, and employing such other characters as context information, the user can much more easily edit a word that is depicted on the display 60.

In the present exemplary embodiment of the handheld electronic device 4, if it is determined, as at 252, that the input is not a selection input, and it is determined, as at 260, that the input is not a delimiter input, and it is further determined, as at 268, that the input is not a movement input, in the current exemplary embodiment of the handheld electronic device 4 the only remaining operational input generally is a detection of the <DELETE> key 86 of the keys 28 of the keypad 24. Upon detection of the <DELETE> key 86, the final character of the default output is deleted, as at 280. At this point, the processing generally waits until another input is detected, as at 284. It is then determined, as at 288, whether the new input detected at 284 is the same as the most recent input that was related to the final character that had just been deleted at 280. If so, the default output 76 is the same as the previous default output, except that the last character is the opposite character of the key actuation that generated the last character. Processing then continues to 292 where learning data, i.e., the word object 108 and the frequency object 104 associated with the previous default output 76, as well as the word object 108 and the frequency object 104 associated with the new default output 76, are stored in the temporary learning data register and the flag is set. Such a key sequence, i.e., an input, the <DELETE> key 86, and the same input as before, is an alternation input. Such an alternation input replaces the default final character with an opposite final character of the key 28 which generated the final character 48 of the default output 76. The alternation input is treated as a selection input for purposes of locking the default output 76 for the current session, and also triggers the flag which will initiate the learning function upon detection of a delimiter input at 260.

If it turns out, however, that the system detects at 288 that the new input detected at 284 is different than the input immediately prior to detection of the <DELETE> key 86, processing continues at 212 where the input is determined to be either an operational input or an input of a key 28 having one or more characters 48, and processing continues thereafter.

It is also noted that when the main process reaches the output stage at 248, an additional process is initiated which determines whether the variant component 72 of the output 64 should be initiated. Processing of the additional function is initiated from 248 at element 504 of FIG. 6. Initially, the method at 508 outputs the text component 68 of the output 64 to the display 60. Further processing determines whether or not the variant component 72 should be displayed.

Specifically, it is determined, as at 512, whether the variant component 72 has already been displayed during the current session. If the variant component 72 has already been displayed, processing continues at 516 where the new variant component 72 resulting from the current disambiguation cycle within the current session is displayed. Processing then returns to a termination point at 520, after which processing returns to the main process at 204. If, however, it is determined at 512 that the variant component 72 has not yet been displayed during the current session, processing continues, as at 524, to determine whether the elapsed time between the current input and the immediately previous input is longer than a predetermined duration. If it is longer, then processing continues at 516 where the variant component 72 is displayed and processing returns, through 520, to the main process, as at 204. However, if it is determined at 524 that the elapsed time between the current input and the immediately previous input is less than the predetermined duration, the variant component 72 is not displayed, and processing returns to the termination point at 520, after which processing returns to the main process, as at 204.

Advantageously, therefore, if a user is entering keystrokes relatively quickly, the variant component 72 will not be output to the display 60, where it otherwise would likely create a visual distraction to a user seeking to enter keystrokes quickly. If at any time during a given session the variant component 72 is output to the display 60, such as if the time between successive inputs exceeds the predetermined duration, the variant component 72 will continue to be displayed throughout that session. However, upon the initiation of a new session, the variant component 72 will be withheld from the display 60 if the user consistently is entering keystrokes relatively quickly.

An exemplary input sequence is depicted in FIGS. 1 and 7-11. In this example, the user is attempting to enter the word "APPLOADER", and this word presently is not stored in the memory 20. In FIG. 1 the user has already typed the "AS" key 28. Since the data tables in the memory 20 are organized according to two-letter prefixes, the contents of the output 64 upon the first keystroke are obtained from the N-gram objects 112 within the memory 20. The first keystroke "AS" corresponds with a first N-gram object 112 "S" and an associated frequency object 104, as well as another N-gram object 112 "A" and an associated frequency object 104. While the frequency object 104 associated with "S" has a frequency value greater than that of the frequency object 104 associated with "A", it is noted that "A" is itself a complete word. A complete word is always provided as the default output 76 in favor of other prefix objects that do not match complete words, regardless of the associated frequency value. As such, in FIG. 1, the default portion 76 of the output 64 is "A".

Figure 7:
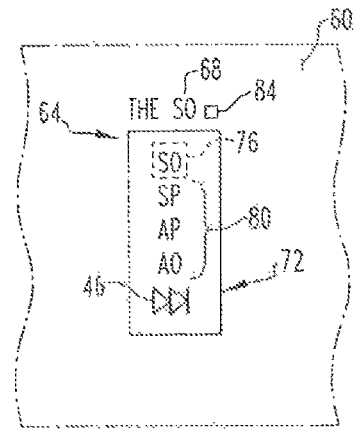
FIG. 7 is an exemplary output during a text entry operation.
Figure 8:
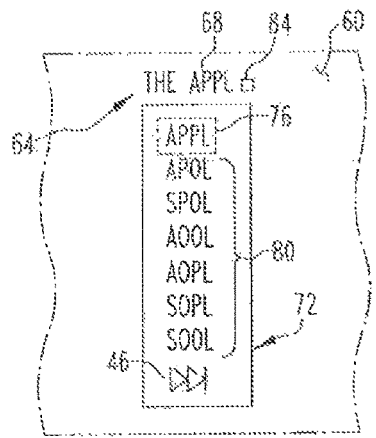
FIG. 8 is another exemplary output during another part of the text entry operation.

In FIG. 7, the user has additionally entered the "OP" key 28. The variants are depicted in FIG. 7. Since the prefix object "SO" is also a word, it is provided as the default output 76. In FIG. 8, the user has again entered the "OP" key 28 and has also entered the "L" key 28. It is noted that the exemplary "L" key 28 depicted herein includes only the single character 48 "L".

It is assumed in the instant example that no operational inputs have thus far been detected. The default output 76 is "APPL", such as would correspond with the word "APPLE". The prefix "APPL" is depicted both in the text component 68, as well as in the default portion 76 of the variant component 72. Variant prefix objects in the variant portion 80 include "APOL", such as would correspond with the word "APOLOGIZE", and the prefix "SPOL", such as would correspond with the word "SPOLIATION".

It is particularly noted that the additional variants "AOOL", "AOPL", "SOPL", and "SOOL" are also depicted as variants 80 in the variant component 72. Since no word object 108 corresponds with these prefix objects, the prefix objects are considered to be orphan prefix objects for which a corresponding word object 108 was not identified. In this regard, it may be desirable for the variant component 72 to include a specific quantity of entries, and in the case of the instant exemplary embodiment, the quantity is seven entries. Upon obtaining the result at 224, if the quantity of prefix objects in the result is fewer than the predetermined quantity, the disambiguation function will seek to provide additional outputs until the predetermined number of outputs are provided. In the absence of artificial variants having been created, the additional variant entries are provided by orphan prefix objects. It is noted, however, that if artificial variants had been generated, they likely would have occupied a place of preference in favor of such orphan prefix objects, and possibly also in favor of the prefix objects of the result.

It is further noted that such orphan prefix objects may actually be offspring orphan prefix objects from suspended parent orphan prefix objects and/or artificial variants. Such offspring orphan prefix objects can be again output depending upon frequency ranking as explained below, or as otherwise ranked.

The orphan prefix objects are ranked in order of descending frequency with the use of the N-gram objects 112 and the associated frequency objects 104. Since the orphan prefix objects do not have a corresponding word object 108 with an associated frequency object 104, the frequency objects 104 associated with the various N-gram objects 112 must be employed as a fallback.

Using the N-gram objects 112, the disambiguation function first seeks to determine if any N-gram object 112 having, for instance, three characters is a match for, for instance, a final three characters of any orphan prefix object. The example of three characters is given since the exemplary embodiment of the handheld electronic device 4 includes N-gram objects 112 that are an exemplary maximum of the three characters in length, but it is understood that if the memory 20 included N-gram objects 112 four characters in length or longer, the disambiguation function typically would first seek to determine whether an N-gram object having the greatest length in the memory 20 matches the same quantity of characters at the end of an orphan prefix object.

If only one prefix object corresponds in such a fashion to a three-character N-gram object 112, such orphan prefix object is listed first among the various orphan prefix objects in the variant output 80. If additional orphan prefix objects are matched to N-gram objects 112 having three characters, then the frequency objects 104 associated with such identified N-gram objects 112 are analyzed, and the matched orphan prefix objects are ranked amongst themselves in order of decreasing frequency.

If it is determined that a match cannot be obtained with an N-gram object 112 having three characters, then two-character N-gram objects 112 are employed. Since the memory 20 includes all permutations of two-character N-gram objects 112, a last two characters of each orphan prefix object can be matched to a corresponding two-character N-gram object 112. After such matches are achieved, the frequency objects 104 associated with such identified N-gram objects 112 are analyzed, and the orphan prefix objects are ranked amongst themselves in descending order of frequency value of the frequency objects 104 that were associated with the identified N-gram objects 112. It is further noted that artificial variants can similarly be rank ordered amongst themselves using the N-gram objects 112 and the associated frequency objects 104.

Figure 9:
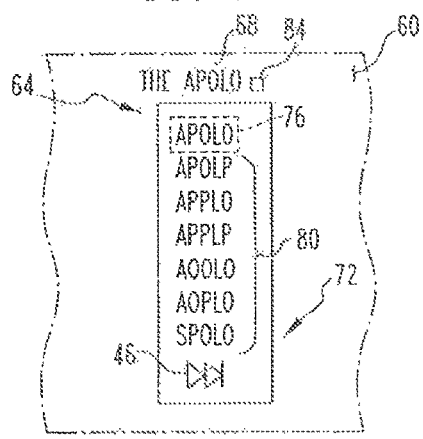
FIG. 9 is another exemplary output during another part of the text entry operation.

In FIG. 9 the user has additionally entered the "OP" key 28. In this circumstance, and as can be seen in FIG. 9, the default portion 76 of the output 64 has become the prefix object "APOLO" such as would correspond with the word "APOLOGIZE", whereas immediately prior to the current input the default portion 76 of the output 64 of FIG. 8 was "APPL" such as would correspond with the word "APPLE". Again, assuming that no operational inputs had been detected, the default prefix object in FIG. 9 does not correspond with the previous default prefix object of FIG. 8. As such, the first artificial variant "APOLP" is generated and in the current example is given a preferred position. The aforementioned artificial variant "APOLP" is generated by deleting the final character of the default prefix object "APOLO" and by supplying in its place an opposite character 48 of the key 28 which generated the final character of the default portion 76 of the output 64, which in the current example of FIG. 9 is "P", so that the aforementioned artificial variant is "APOLP".

Furthermore, since the previous default output "APPL" corresponded with a word object 108, such as the word object 108 corresponding with the word "APPLE", and since with the addition of the current input the previous default output "APPL" no longer corresponds with a word object 108, two additional artificial variants are generated. One artificial variant is "APPLP" and the other artificial variant is "APPLO", and these correspond with the previous default output "APPL" plus the characters 48 of the key 28 that was actuated to generate the current input. These artificial variants are similarly output as part of the variant portion 80 of the output 64.

As can be seen in FIG. 9, the default portion 76 of the output 64 "APOLO" no longer seems to match what would be needed as a prefix for "APPLOADER", and the user likely anticipates that the desired word "APPLOADER" is not already stored in the memory 20. As such, the user provides a selection input, such as by scrolling with the thumbwheel 32, or by actuating the <NEXT> key 40, until the variant string "APPLO" is highlighted. The user then continues typing and enters the "AS" key 28.

Figure 10:
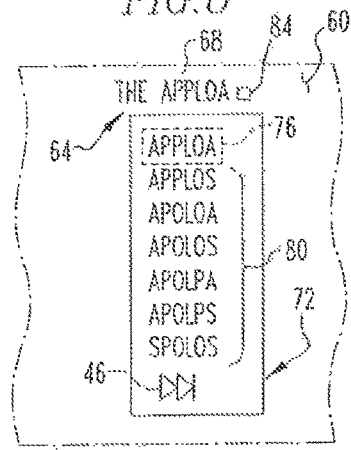
FIG. 10 is another exemplary output during another part of the text entry operation.

The output 64 of such action is depicted in FIG. 10. Here, the string "APPLOA" is the default portion 76 of the output 64. Since the variant string "APPLO" became the default portion 76 of the output 64 (not expressly depicted herein) as a result of the selection input as to the variant string "APPLO", and since the variant string "APPLO" does not correspond with a word object 108, the character strings "APPLOA" and "APPLOS" were created as artificial variants. Additionally, since the previous default of FIG. 9, "APOLO" previously had corresponded with a word object 108, but now is no longer in correspondence with the default portion 76 of the output 64 of FIG. 10, the additional artificial variants of "APOLOA" and "APOLOS" were also generated. Such artificial variants are given a preferred position in favor of the three displayed orphan prefix objects.

Since the current input sequence in the example no longer corresponds with any word object 108, the portions of the method related to attempting to find corresponding word objects 108 are not executed with further inputs for the current session. That is, since no word object 108 corresponds with the current input sequence, further inputs will likewise not correspond with any word object 108. Avoiding the search of the memory 20 for such nonexistent word objects 108 saves time and avoids wasted processing effort.

As the user continues to type, the user ultimately will successfully enter the word "APPLOADER" and will enter a delimiter input. Upon detection of the delimiter input after the entry of "APPLOADER", the learning function is initiated. Since the word "APPLOADER" does not correspond with a word object 108 in the memory 20, a new word object 108 corresponding with "APPLOADER" is generated and is stored in the new words database 92, along with a corresponding new frequency object 104 which is given an absolute frequency in the upper, say, one-third or one-fourth of the possible frequency range. In this regard, it is noted that the new words database 92 and the frequency learning database 96 are generally organized in two-character prefix data tables similar to those found in the generic word list 88. As such, the new frequency object 104 is initially assigned an absolute frequency value, but upon storage, the absolute frequency value, if it is not the maximum value within that data table, will be changed to include a normalized frequency value percentage normalized to whatever is the maximum frequency value within that data table.

Figure 11:
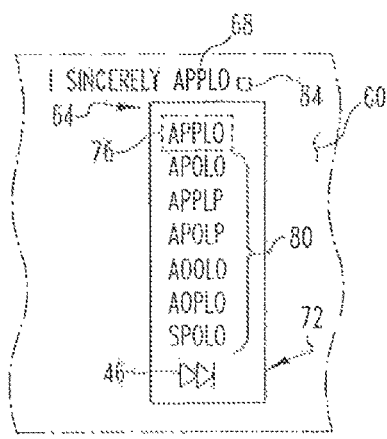
FIG. 11 is an exemplary output on the handheld electronic device during another text entry operation.

As a subsequent example, in FIG. 11 the user is trying to enter the word "APOLOGIZE". The user has entered the key sequence "AS" "OP" "OP" "L" "OP". Since "APPLOADER" has now been added as a word object 108 to the new words database 92 and has been associated with frequency object 104 having a relatively high frequency value, the prefix object "APPLO" which corresponds with "APPLOADER" has been displayed as the default portion 76 of the output 64 in favor of the variant prefix object "APOLO", which corresponds with the desired word "APOLOGIZE." Since the word "APOLOGIZE" corresponds with a word object 108 that is stored at least in the generic word list 88, the user can simply continue to enter keystrokes corresponding with the additional letters "GIZE", which would be the letters in the word "APOLOGIZE" following the prefix object "APOLO", in order to obtain the word "APOLOGIZE". Alternatively, the user may, upon seeing the output 64 depicted in FIG. 11, enter a selection input to affirmatively select the variant prefix object "APOLO". In such a circumstance, the learning function will be triggered upon detection of a delimiter symbol, and the word object 108 that had corresponded with the character string "APOLO" at the time the selection input was made will be stored in the frequency learning database 96 and will be associated with a revised frequency object 104 having a relatively higher frequency value that is similarly stored in the frequency learning database 96.

Figure 12:
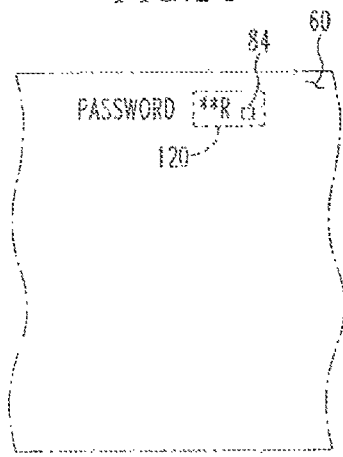
FIG. 12 is an exemplary output that can be provided in an instance when the disambiguation function of the handheld electronic device has been disabled.

An additional feature of the handheld electronic device 4 is depicted generally in FIG. 12. In some circumstances, it is desirable that the disambiguation function be disabled. For instance, when it is desired to enter a password, disambiguation typically is relatively more cumbersome than during ordinary text entry. As such, when the system focus is on the component corresponding with the password field, the component indicates to the API that special processing is requested, and the API disables the disambiguation function and instead enables, for instance, a multi-tap input interpretation system. Alternatively, other input interpretation systems could include a chording system or a press-and-hold/press-and-release interpretation system. As such, while an input entered with the disambiguation function active is an ambiguous input, by enabling the alternative interpretation system, such as the exemplary multi-tap system, each input can be largely unambiguous.

As can be understood from FIG. 12, each unambiguous input is displayed for a very short period of time within the password field 120, and is then replaced with another output, such as the asterisk. The character "R" is shown displayed, it being understood that such display is only for a very short period of time.

As can be seen in FIGS. 1 and 7-11, the output 64 includes the displayed graphic 46 near the lower end of the variant component 72, and that the displayed graphic 46 is highly similar to the graphic 42 of the <NEXT> key 40. Such a depiction provides an indication to the user which of the keys 28 of the keypad 24 can be actuated to select a variant output. The depiction of the displayed graphic 46 provides an association between the output 64 and the <NEXT> key 40 in the user's mind. Additionally, if the user employs the <NEXT> key 40 to provide a selection input, the user will be able to actuate the <NEXT> key 40 without moving the user's hands away from the position the hands were in with respect to the housing 6 during text entry, which reduces unnecessary hand motions, such as would be required if a user needed to move a hand to actuate the thumbwheel 32. This saves time and effort.

It is also noted that the system can detect the existence of certain predefined symbols as being delimiter signals if no word object 108 corresponds with the text entry that includes the symbol. For instance, if the user desired to enter the input "one-off", the user might begin by entering the key sequence "OP" "BN" "ER" "ZX" "OP", with the "ZX" actuation being intended to refer to the hyphen symbol disposed thereon. Alternatively, instead of typing the "ZX" key, the user might actuate an <ALT> entry to unambiguously indicate the hyphen.

Assuming that the memory 20 does not already include a word object 108 of "one-off", the disambiguation function will detect the hyphen as being a delimiter input. As such, the key entries preceding the delimiter input will be delimited from the key entries subsequent to the delimiter input. As such, the desired input will be searched as two separate words, i.e., "ONE" and "OFF", with the hyphen therebetween. This facilitates processing by more narrowly identifying what is desired to be searched.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the foil breadth of the claims appended and any and all equivalents thereof.

The invention claimed is:

1. A handheld electronic device, comprising:
   a processor;
   an input apparatus including a plurality of input keys;
   an output apparatus; and
   a memory having stored therein a plurality of word objects associated with a plurality of frequency values;
   wherein the processor is configured to:
     detect an ambiguous input;
     generate a plurality of prefix objects based on the ambiguous input;
     for each of the plurality of prefix objects, identify word objects corresponding to the ambiguous input;
     output in a variant component the plurality of prefix objects including a default prefix object and a plurality of variant prefix objects, wherein the default prefix object is highlighted and the plurality of variant prefix objects are sorted according to the frequency values of the identified plurality of words;
     detect an input key selection that selects at least one of the default prefix object or the plurality of variant prefix objects in the variant component;
     output, based on the input key selection, a word object that includes at least the selected prefix object and is one of the identified word objects for the selected prefix object;
     detect an additional input of a key associated with an input character after outputting the word object; and
     output in the variant component an additional prefix object associated with the additional input and the selected prefix object, wherein the additional prefix object does not correspond to any of the plurality of word objects.

2. The handheld electronic device of claim 1, wherein the default prefix object has a relatively higher frequency value than the plurality of variant prefix objects.

3. The handheld electronic device of claim 1, wherein the processor is further configured to:
   detect a second additional input being a delimiter input after outputting the additional prefix object;
   determine that the outputted additional prefix object at the time of the detection of the delimiter input does not match a word object in a word database; and
   add the outputted additional prefix object to the word database for future use.

4. The handheld electronic device of claim 1, wherein the processor is further configured to:
   detect a second additional input being delimiter input after outputting the word object;
   determine that the outputted word object at the time of the detection of the delimiter input does match a word object in a word database, but that the outputted word object was not associated with the default prefix object; and
   change the frequency value associated with the outputted word object for future use.

5. The handheld electronic device of claim 1, wherein each prefix object and word object is formed of one or more characters, and wherein the number of characters of each prefix object is less than the number of characters of the corresponding identified word object.

6. The handheld electronic device of claim 1, wherein the plurality of word objects are stored in at least a first dictionary, and the processor is further configured to:
   detect the input of the ambiguous input as being a part of a new word object not already stored on the electronic device; and
   store the new word object in the at least first dictionary.

7. A method of disambiguating an input into a handheld electronic device, the method comprising:
   detecting an ambiguous input;
   generating a plurality of prefix objects based on the ambiguous input;
   for each of the plurality of prefix objects, identifying one or more word objects corresponding to the ambiguous input, each of the plurality of word objects is associated with a frequency value;
   outputting in a variant component the plurality of prefix objects including a default prefix object and a plurality of variant prefix objects, wherein the default prefix object is highlighted and the plurality of variant prefix objects are sorted according to the frequency values of the identified plurality of words;
   detecting an input key selection that selects at least one of the default prefix object or the plurality of variant prefix objects in the variant component;
   outputting, based on the input key selection, a word object that includes at least the selected prefix object and is one of the identified one or more word objects for the selected prefix object;
   detecting an additional input of a key associated with an input character; and
   outputting in the variant component an additional prefix object associated with the additional input and the selected prefix object, wherein the additional prefix object does not correspond to any of the plurality of word objects.

8. The method of claim 7, wherein the default prefix object has a relatively higher frequency value than the plurality of variant prefix objects.

9. The method of claim 7 further comprising:
   detecting a second additional input being delimiter input after outputting the additional prefix object;

determining that the outputted additional prefix object at the time of the detection of the delimiter input does not match a word object in a word database; and adding the outputted additional prefix object to the word database for future use.

10. The method of claim 7 further comprising:

detecting a second additional input being delimiter input after outputting the word object;

determining that the outputted word object at the time of the detection of the delimiter input does match a word object in a word database, but that the outputted word object was not associated with the default prefix object; and changing the frequency value associated with the outputted word object to for future use.

11. The method of claim 7, wherein each prefix object and word object is formed of one or more characters, and wherein the number of characters of each prefix object is less than the number of characters of the corresponding identified word object.

12. The method of claim 7, wherein the plurality of word objects are stored in at least a first dictionary, and further comprising:

detecting the input of the ambiguous input as being a part of a new word object not already stored on the electronic device; and storing the new word object in the at least first dictionary.

13. A software product stored on a non-transitory computer readable medium and comprising data and computer implementable instructions for carrying out the method of claim 7.

* * * * *